United States Patent
Arita et al.

[11] Patent Number: 5,287,264
[45] Date of Patent: Feb. 15, 1994

[54] MULTICONTROLLER APPARATUS, MULTICONTROLLER SYSTEM, NUCLEAR REACTOR PROTECTION SYSTEM, INVERTER CONTROL SYSTEM AND DIAGNOSTIC DEVICE

[75] Inventors: Setsuo Arita, Hitachiota; Tetsuo Ito, Hitachi, both of Japan

[73] Assignee: Hitachi, Ltd., Tokyo, Japan

[21] Appl. No.: 44,897

[22] Filed: Apr. 7, 1993

Related U.S. Application Data

[63] Continuation of Ser. No. 387,982, Aug. 1, 1989, abandoned.

[30] Foreign Application Priority Data

Aug. 5, 1988 [JP] Japan ............................. 63-194435

[51] Int. Cl.$^5$ ..................... G06F 15/46; G21C 17/00
[52] U.S. Cl. ..................... 364/184; 364/186; 364/187; 371/9.1; 376/215
[58] Field of Search ............... 364/184–187, 364/138, 139, DIG. 1 MS File, DIG. 2 MS File; 371/9.1, 16.1; 376/215, 216, 217, 259; 395/575

[56] References Cited

U.S. PATENT DOCUMENTS

| | | | |
|---|---|---|---|
| 4,276,593 | 6/1981 | Hansen | 371/9.1 X |
| 4,427,620 | 6/1984 | Cook | 376/216 |
| 4,500,951 | 2/1985 | Sugimoto et al. | 364/186 |
| 4,517,154 | 5/1985 | Dennis et al. | 376/259 |
| 4,623,883 | 11/1986 | Konen | 371/9.1 X |
| 4,684,885 | 8/1987 | Caapman et al. | 371/9.1 |
| 4,843,537 | 6/1989 | Arita et al. | 364/187 |

FOREIGN PATENT DOCUMENTS

| | | |
|---|---|---|
| 180085 | 5/1986 | European Pat. Off. |
| 60-064296 | 12/1985 | Japan |
| 62-280697 | 5/1987 | Japan |
| 63-140305 | 11/1988 | Japan |

OTHER PUBLICATIONS

"Atomic Power Handbook"–pp. 262-267; Table 9.6; Nov. 30, 1976.

*Primary Examiner*—Joseph Ruggiero
*Attorney, Agent, or Firm*—Antonelli, Terry, Stout & Kraus

[57] ABSTRACT

A multicontroller apparatus has a plurality of control units each including a controller and a diagnostic device for making a diagnosis of the controller. Each diagnostic device includes an apparatus for judging states of other control units by using output signals of diagnostic devices included in the other control units and an apparatus for executing a diagnosis of the associated controller which is a diagnosis object of the diagnostic device when the judging apparatus has judged that one or more other control units are not in the diagnosis state. Owing to the present invention, a necessary number of controllers which are in the controllable state can always be ensured in a multicontroller apparatus. Therefore, control by the multicontroller apparatus is always possible, and it becomes possible to make a diagnosis upon the multicontroller apparatus.

16 Claims, 28 Drawing Sheets

MULTICONTROLLER APPARATUS, MULTICONTROLLER SYSTEM, NUCLEAR REACTOR PROTECTION SYSTEM, INVERTER CONTROL SYSTEM AND DIAGNOSTIC DEVICE

This application is a continuation of application Ser. No. 387,982 filed on Aug. 1, 1989, now abandoned.

BACKGROUND OF THE INVENTION

The present invention relates to a multicontroller apparatus, a multicontroller system, a nuclear reactor protection system, an inverter control system and a diagnostic device, and in particular to a multicontroller apparatus, a multicontroller system, a nuclear reactor protection system, an inverter control system and a diagnostic device suitable for asynchronous use.

The present invention is related to U.S. Pat. application Ser. Nos. 069,170 filed on Jul. 2, 1987 and 242,170 filed on Sep. 9, 1988 now U.S. Pat. No. 4,989,129, both assigned to the assignee of the present application.

In general, in important control systems, it is attempted to raise the reliability of the whole system by providing controllers o safety-protection apparatuses with redundancy. Further, in order to raise the rate of operation of the whole control system, diagnosis of controllers provided with redundancy is made. A controller having an abnormality found by means of diagnosis is rapidly repaired.

For example, an example of a multicontroller apparatus having a diagnostic device is described in U.S. Pat. No. 4,517,154. This known multicontroller apparatus has been applied to a nuclear reactor protection system and has an online diagnostic system. That is to say, one diagnostic device is provided for four redundant controllers. This diagnostic device outputs a test signal successively to the four redundant controllers and receives answer signals from the four redundant controllers. On the basis of the answer signal fed from each controller, it is judged whether an abnormality is present in that controller or not.

If a single diagnostic device makes diagnoses of four redundant controllers, diagnosis of all of the controllers is not performed suitably when the diagnostic device itself becomes abnormal. Even if a controller is normal, it then might be judged abnormal. Even if a controller is abnormal, it might be judged normal.

A multicontroller apparatus having one diagnostic device provided for each of four redundant controllers so that one diagnostic device may make a diagnosis of one controller is described in JP-A-62-280697. Such a multicontroller apparatus eliminates the problems of the multicontroller apparatus described in U.S. Pat. No. 4,517,154.

By providing a plurality of redundant diagnostic devices as described in JP-A-62-280697, each diagnostic device can arbitrarily make a diagnosis of its corresponding controller. However, there is a possibility that diagnoses are simultaneously made of all controllers. In this case, control of a control object by controller becomes impossible. Such a state must be avoided in a nuclear reactor plant which especially requires safety.

SUMMARY OF THE INVENTION

A first object of the present invention is to provide a multicontroller apparatus, a multicontroller system, a nuclear reactor protection system and an inverter control system in which diagnoses can be made of controllers and control objects can be always controlled by the controllers.

A second object of the present invention is to provide a multicontroller apparatus in which useless processing in reopening diagnosis can be reduced and an opportunity for diagnosis can be given to all diagnostic devices.

A third object of the present invention is to Provide a multicontroller apparatus in which states of other diagnostic devices at the time when a diagnosis is started can be accurately grasped.

A fourth object of the present invention is to provide a multicontroller apparatus in which a diagnosis can be suitably made by a diagnostic device when one or more diagnostic devices give previous notice of diagnosis.

A fifth object of the present invention is to provide a multicontroller apparatus in which abnormality of other diagnostic devices can be detected.

A sixth object of the present invention is to provide a multicontroller apparatus in which control effected by means of an output signal of a controller staying in the diagnostic state can be prevented.

A seventh object of the present invention is to provide a multicontroller apparatus in which control performed by a controller is not obstructed while it is being effected.

An eighth object of the present invention is to provide a diagnostic device capable of judging asynchronously whether a diagnosis can be started or not.

A first feature of the present invention is that a diagnostic device carries out a diagnosis of a controller which is a diagnostic object of the diagnostic apparatus when the diagnostic device judges that one or more other control units among other control units which do not include the diagnostic device are not in the diagnostic state.

In accordance with the first feature of the present invention, a diagnosis of a controller which is a diagnosis object of the diagnostic apparatus is carried out when one or more other control units among other control units are judged not to be in the diagnosis state. Therefore, a diagnostic apparatus can autonomously make a diagnosis of a pertinent controller. Further, since a necessary number of controllers which are in a controllable state can be held in a multicontroller apparatus, control performed by a multicontroller apparatus is always possible.

A second feature for achieving a second object of the present invention is that when a diagnostic device judges the number of other control units which are not in the diagnosis state to be less than a predetermined number, reopening of the diagnosis by the diagnostic device is obstructed for a first predetermined time and reopening of the diagnosis by the diagnostic device after completion of diagnosis of the controller is obstructed for a second predetermined time which is longer than the first predetermined time.

In accordance with the second feature of the present invention, reopening of the diagnosis made by the diagnostic device is obstructed for the first predetermined time when the number of other control units which are not in the diagnostic state has been judged to be less than the predetermined number. Therefore, useless processing performed when the diagnostic device reopens the diagnosis is reduced. Further, since reopening of diagnosis performed by the diagnostic device is obstructed for the second predetermined time longer than the first predetermined time, another diagnosis by the diagnostic device after completion of a diagnosis is not made immediately, and opportunity of diagnosis can be given to all diagnostic devices.

A third feature of the present invention is that a diagnostic device comprises means for outputting a diagnosis notice signal to diagnostic devices of other control units and means for outputting an answer signal in response to a diagnosis notice signal outputted by a diagnostic device of another control unit, and judgment means for judging the state of another control unit by using the answer signal fed from a diagnostic device of another control unit in response to a diagnosis notice signal outputted by its own diagnostic device. Owing to the third feature, the third object of the present invention is achieved.

In accordance with the third feature, the state of another control unit is judged on the basis of an answer signal outputted by a diagnostic device of the control unit. Therefore, the state of another control unit at the time of diagnosis notice from the diagnostic device can be accurately grasped, resulting in improvement of precision in judging whether diagnosis can be performed by the diagnostic device or not.

A fourth feature for achieving the fourth object of the present invention is that a diagnostic device comprises diagnosis notification judgment means for judging whether the number of other diagnostic devices each outputting a diagnosis notice signal is equal to or larger than a predetermined number or not, and means for keeping its own diagnosis notice signal outputting means from outputting the diagnosis notice signal again for a predetermined time in case the judgment result of the diagnosis notice judgment means is "yes", and the above described predetermined time is so set as to have different value in diagnostic devices of respective control units.

Since the predetermined time for which each of other diagnostic devices each outputting a diagnosis notice signal prevents its own diagnosis notice signal output means from outputting a diagnosis notice signal again is so set as to have different values in diagnostic devices of respective control units, the number of other diagnostic devices outputting diagnosis notice signals does not become the predetermined number or more again. A diagnosis can thus be made by a diagnostic device.

A fifth object of the present invention is achieved by a fifth feature of the present invention that a diagnostic device comprises means for judging whether an abnormality is present or not in diagnostic devices of other control units on the basis of output signals of diagnostic devices of other control units.

In accordance with the fifth feature, the diagnostic device thus judges whether an abnormality is present or not in other diagnostic devices on the basis of output signals of diagnostic devices of other control units, and hence an abnormality in other diagnostic devices can be easily detected.

A sixth feature of the present invention for achieving the sixth object of the present invention is that each diagnostic device outputs a first switching signal when it has judged that one or more other control units are not in the diagnosis state and outputs a second switching signal after the completion of diagnosis of the controller, and each control unit comprises switching means for disabling control performed by a signal outputted from the controller on the basis of the first switching signal and for enabling control performed by a signal outputted from the controller on the basis of the second switching signal.

In accordance with the sixth feature, the switching means thus disables control performed by a signal outputted from the controller on the basis of the first switching signal. Therefore, control performed by the output signal of the controller which is in the diagnosis state can be prevented.

A seventh feature of the present invention for achieving the seventh object of the present invention is that a diagnostic device is configured so as to obstruct execution of a diagnosis made on a controller by a diagnostic device when the diagnostic device is included in the control unit of the controller and the controller outputs a signal for controlling the object of control.

In accordance with the seventh feature, a diagnostic device included in the control unit having therein a controller outputting a signal for controlling the object of control is thus prevented from making a diagnosis of the controller, and hence the control performed by the controller is not hampered.

The eighth object of the present invention is achieved by an eighth feature of the present invention that means for judging the states of other diagnostic devices on the basis of output signals of a plurality of other diagnostic devices and means for outputting a test signal when the judgment means judges that one or more other diagnostic devices not in the diagnosis state are provided.

In accordance with the eighth feature of the present invention, a diagnostic device thus judges the states of other diagnostic devices on the basis of output signals of a plurality of other diagnostic devices and outputs a test signal when one or more other diagnostic device are judged not to be in the diagnosis state. Therefore, a diagnostic device capable of asynchronously judging whether a diagnosis can be started or not is obtained.

DETAILED DESCRIPTION OF THE PREFERRED EMBODIMENTS

A nuclear reactor protection apparatus which is a embodiment of the present invention and which has been applied to a boiling water type nuclear reactor will now be described. This nuclear reactor protection apparatus exemplifies four redundant controllers.

The nuclear reactor protection apparatus comprises four redundant control units 1A, 1B, 1C and 1D, a display device 16, a signal selection device 20, an electromagnetic valve 23 and piping 24. The control units have identical configurations. The control unit 1A comprises a controller 2A, a diagnostic device 4A, and changeover switches $6A_1$ to $6A_n$ and 7A. The control unit 1B comprises a controller 2B, a diagnostic device 4B, and changeover switches $6B_1$ to $6B_n$ and 7B. The control unit 1C comprises a controller 2C, a diagnostic device 4C and changeover switches $6C_1$ to $6C_n$ and 7C. The control unit 1D comprises a controller 2D, a diagnostic device 4D, and changeover switches $6D_1$ to $6D_n$ and 7D. In order to measure n kinds of quantities of process state, four groups each comprising n sensors are disposed in the nuclear reactor plant. That is to say, sensors $SA_1$ to $SA_n$, $SB_1$ to $SB_n$, $SC_1$ to $SC_n$ and $SD_1$ to $SD_n$ are disposed. Among these sensors, four sensors having an identical suffix detect an identical process state quantity.

Figure 3:
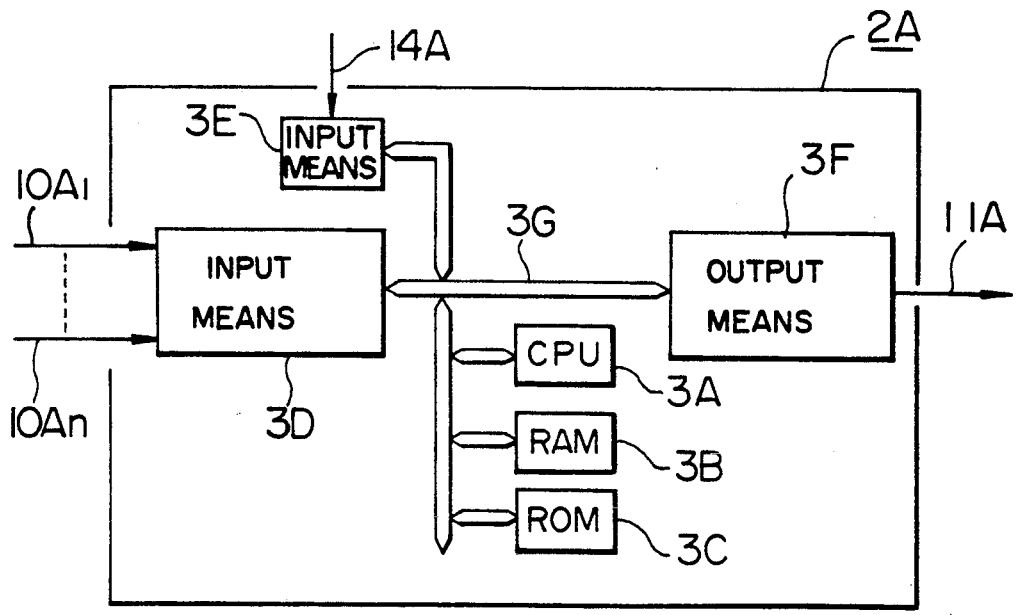
FIG. 3 is a configuration diagram of a controller shown in FIG. 2.
Figure 4:
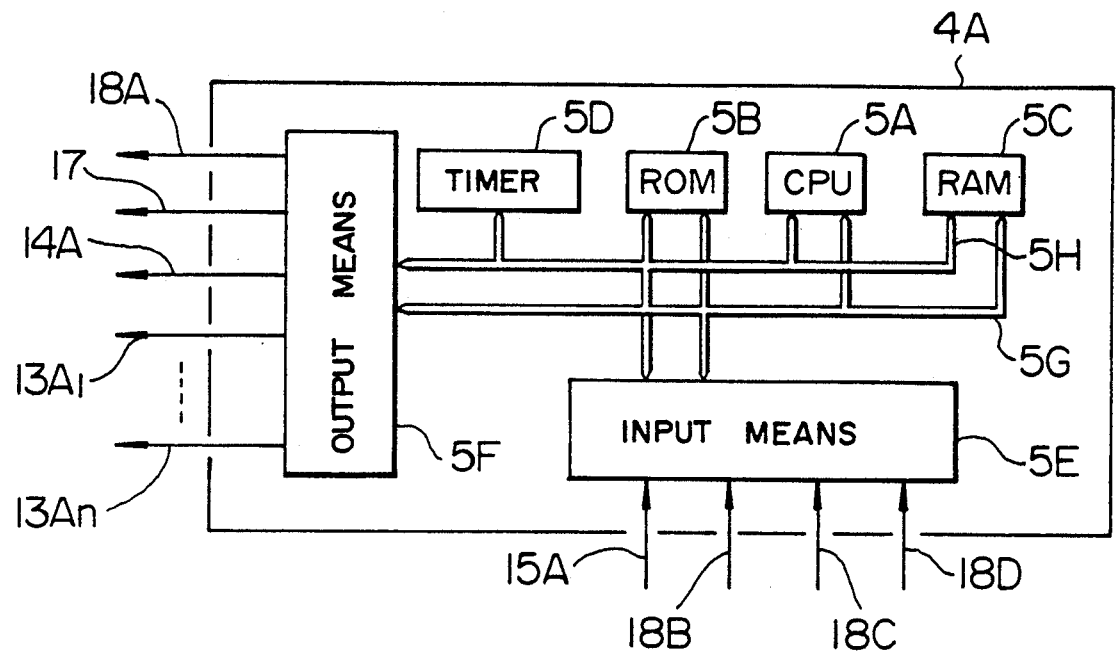
FIG. 4 is a configuration diagram of a diagnostic device shown in FIG. 2.

A detailed configuration of the control units will now be described in detail with reference to FIG. 2 by taking a control unit 1A as an example Each of the changeover switches $6A_1$ to $6A_n$ and 7A has fixed terminals 8A and 8B as well as a movable terminal 8C. The movable terminal 8C is connected to the fixed terminal 8A or the fixed terminal 8B. Fixed terminals 8A of the changeover switches $6A_1$ to $6A_n$ are connected to the sensors $SA_1$ to $SA_n$ via wiring $9A_1$ to $9A_n$, respectively. The controller 2A comprises a microprocessor. As shown in FIG. 3, the controller 2A comprises a CPU 3A, a RAM 3B, a RAM 3C, input means 3D and 3E, output means 3F, and an internal bus 3G for connecting them. The input means 3D is connected to the movable terminals 8C of the changeover switches $6A_1$ to $6A_n$ via wiring $10A_1$ to $10A_n$, respectively. The output means 3F is connected to the fixed terminal 8A of the changeover switch 7A via wiring 11A. The fixed terminal 8B of the changeover switch 7A is connected to a reference power supply 12 generating a reference voltage (corresponding to a logic "1" such as 5 V). The diagnostic device 4A comprises a microprocessor. As shown in FIG. 4, the diagnostic device 4A comprises a CPU 5A, a ROM 5B, a RAM 5C, a timer 5D, input means 5E, output means 5F, and an address bus 5G and a data bus 5H connecting them. Wiring $13A_1$ to $13A_n$ respectively conveying test signals $TS_1$ to $TS_n$ are connected to the output means 5F. Other ends of the wiring $13A_1$ to $13A_n$ are connected to fixed terminals 8B of the changeover switches $6A_1$ to $6A_n$, respectively. Wiring 14A connected to the output means 5F is connected to the input means 3E of the controller and the changeover switches $6A_1$ to $6A_n$ and 7A. Wiring 15A connected to the wiring 11A is connected to the input means 5E.

Wiring 17 connected to the output means 5F of the diagnostic device 4A communicates with the display device 16. The wiring 17 is connected to respective output means 5F of the diagnostic devices 4B, 4C and 4D. Wiring 18A connected to the output means 5F of the diagnostic device 4A is connected to respective input means 5E of the diagnostic devices 4B, 4C and 4D. Wiring 18B is connected to the output means 5F of the diagnostic device 4B and connected to the input means 5E of the diagnostic devices 4A, 4C and 4D. Wiring 18C is connected to the output means 5F of the diagnostic device 4C and connected to the input means 5E of the diagnostic devices 4A, 4B and 4D. Wiring 18D is connected to output means 5F of the diagnostic device 4D and connected to input means 5E of the diagnostic devices 4A, 4B and 4C.

The sensors $SB_1$ to $SB_n$ are connected to the fixed terminals 8A of the changeover switches $6B_1$ to $6B_n$ of the control unit 1B via wiring $9B_1$ to $9B_n$. In the same way, the sensors $SC_1$ to $SC_n$ are connected to the fixed terminals 8A of the changeover switches $6C_1$ to $6C_n$ via wiring $9C_1$ to $9C_n$, and the sensors $SD_1$ to $SD_n$ are connected to the fixed terminals 8A of the changeover switches $6D_1$ to $6D_n$ via wiring $9D_1$ to $9D_n$.

Figure 5:
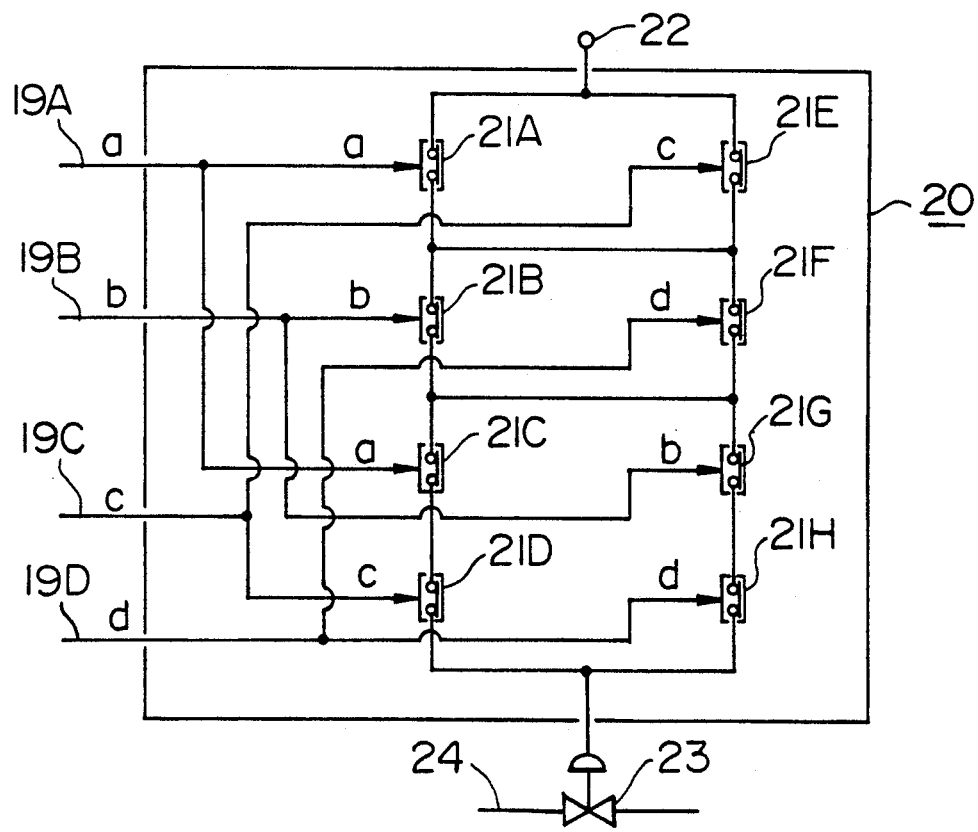
FIG. 5 is a configuration diagram of a signal selection device shown in FIG. 1.

Wiring 19A, 19B, 19C and 19D are connected to the movable terminals 8C of the changeover switches 7A, 7B, 7C and 7D, respectively. The wiring 19A to 19D communicate with the signal selection device 20. The structure of the signal selection device 20 is shown in FIG. 5. The signal selection device 20 comprises relays 21A to 21H. The relays 21A to 21D are serially connected to a terminal 22 for a power supply. The relays 21E to 21H are also serially connected to the power supply terminal 22. The relay 21A has an output terminal connected to that of the relay 21E. The relay 21B has an output terminal connected to that of the relay 21F. Output terminals of relays 21D and 21H are connected to an excitation coil (not illustrated) of the electromagnetic valve 23 to be controlled. The relays may be replaced by semiconductor devices. The wiring 19A is connected to the relays 21A and 21C. The wiring 19B is connected to the relays 21B and 21G. The wiring 19C is connected to the relays 21D and 21E. The wiring 19D is connected to the relays 21F and 21H.

The signal selection device 20 comprises a logic circuit of "2 out of 4 logic" (logic "0" dominant). When two output signals out of output signals a, b, c and d respectively of four redundant controllers 2A, 2B, 2C and 2D are logic "0"s and the remaining output signals are logic "1"s, the signal selection device 20 yields a logic "0" as its output signal Z, resulting in logic "0"

dominant. The logic circuit of the signal selection device 20 can be represented by the following equation $$Z = abc + bcd + cda + dab \quad (1)$$

It is a matter of course that a signal selection device having configuration different from that of FIG. 5 may be used so long as the equation (1) is satisfied.

When the movable terminal 8C of the changeover switch 7A is connected to the fixed terminal 8B in order to make a diagnosis of the control device 2A, for example, the output voltage of the reference power supply 12 is conveyed to the signal selection device 20 a the output signal a (logic "1"). Therefore, the equation (1) becomes $$Z = b + cd + db \quad (2)$$

The equation (2) represents "2 out of 3 logic". That is to say, the changeover switch 7A is switched to the reference power supply 12 when a diagnosis is to be made of the control device 2A. The signal selection device 20 is thus switched from the 2 out of 4 logic configuration with logic "0" dominant to the 2 out of 3 logic configuration. In this state, the signal selection device 20 performs decision by majority on the basis of output signals of the controllers 2B, 2C and 2D.

Although not illustrated, four redundant signal selection devices 20 configured as shown in FIG. 5 are provided. Four redundant electromagnetic valves 23 are also provided. The electromagnetic valve 23 is disposed in piping 24. The piping 24 supplies working air to a scram inlet valve and a scram outlet valve as described in JP-A-60-64296.

The configuration of the nuclear reactor protection apparatus according to the present embodiment has heretofore been described. Its operation will now be described.

Figure 6:
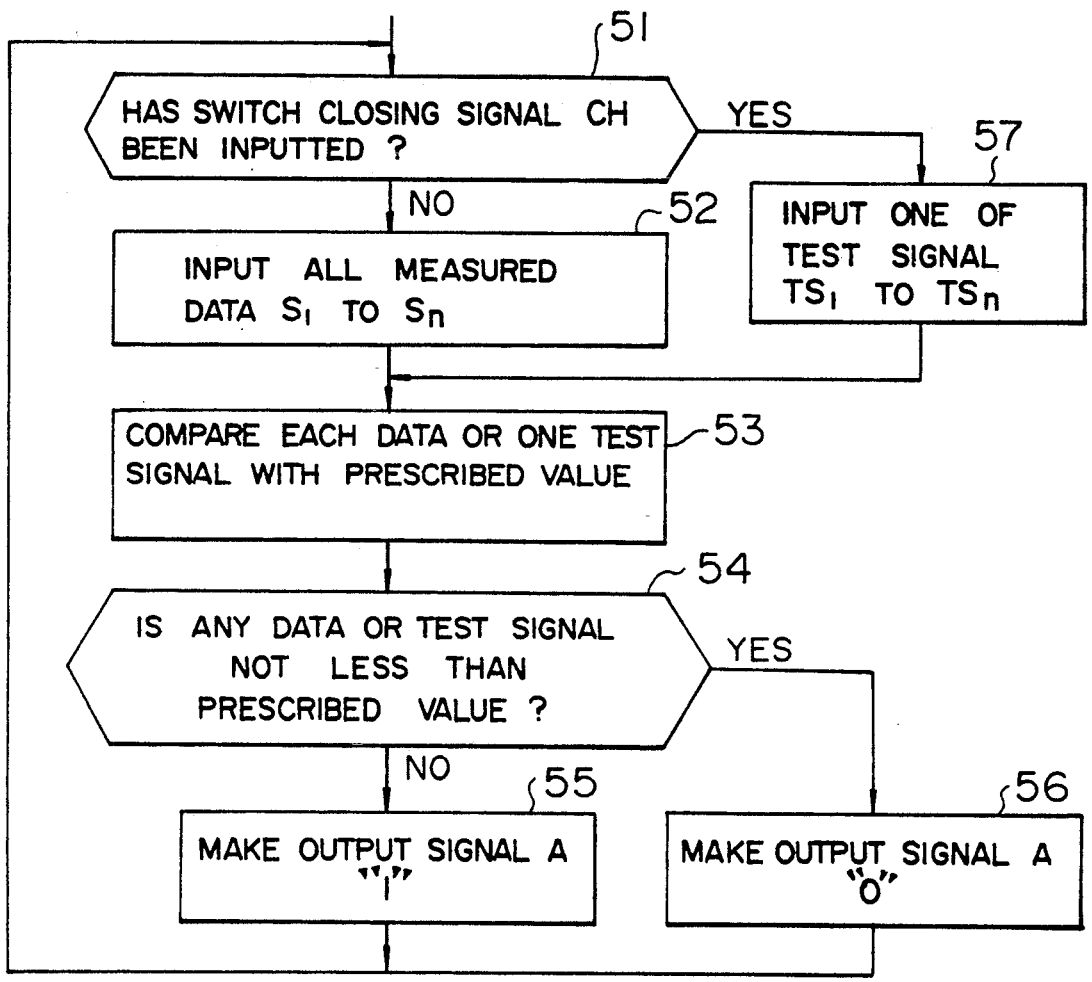
FIG. 6 is a flow chart used for explaining the processing procedure executed in the controller shown in FIG. 3.

A processing procedure comprising steps 51 to 57 shown in FIG. 6 is stored beforehand in the ROM 3C of the controller 2A. A processing procedure similar to that of FIG. 6 is stored beforehand in a ROM of each of controllers 2B, 2C and 2D. The processing procedure executed in the controller 2 is obtained by replacing the output signal a with the output signal b in FIG. 6. The processing procedure executed in the controller 2C is obtained by replacing the output signal a with the output signal c in FIG. 6. The processing procedure executed in the controller 2D is obtained by replacing the output signal a with the output signal d in FIG. 6.

Figure 8:
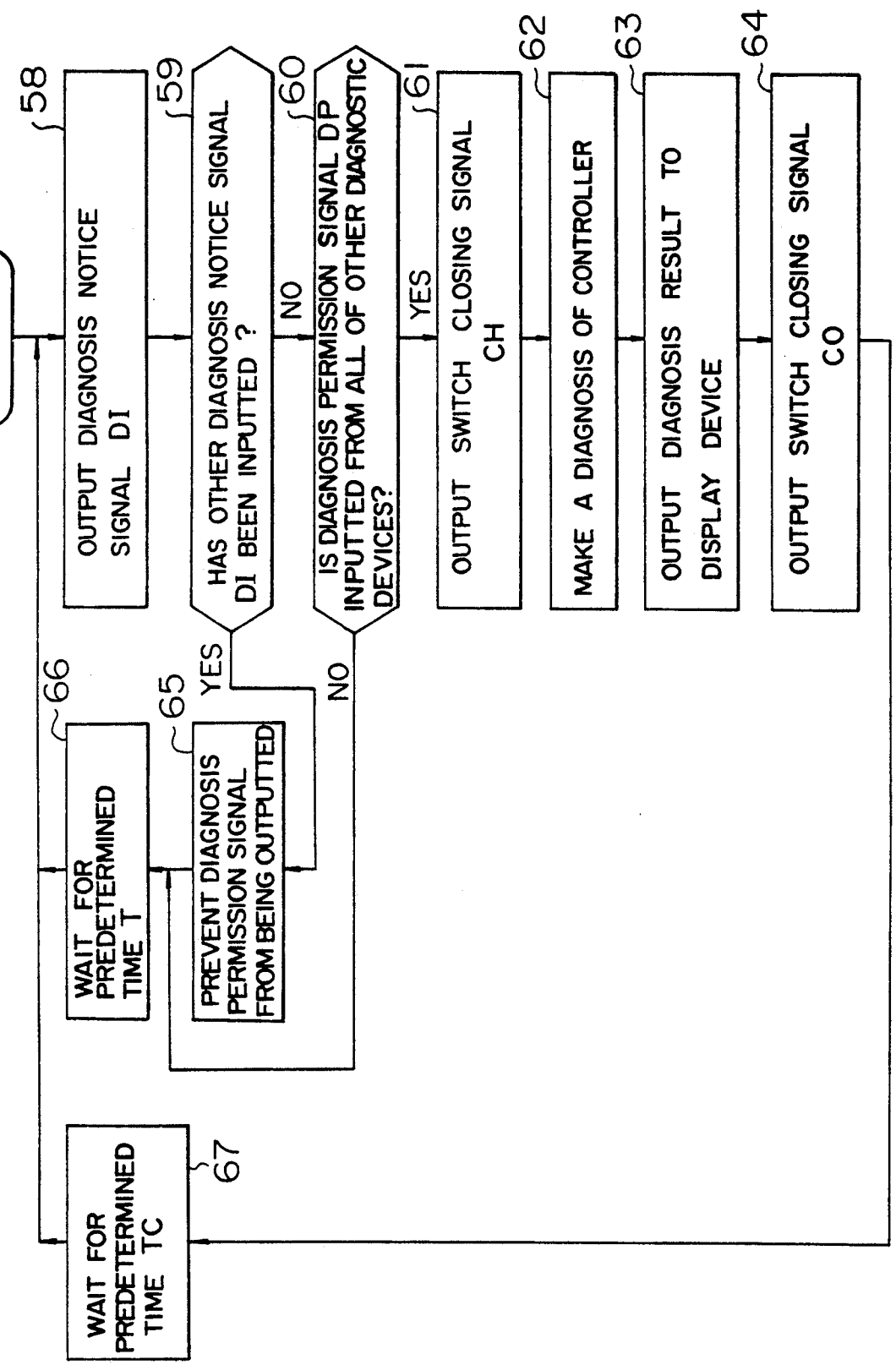
FIG. 8 is a diagram used for explaining the processing procedure of main processing executed in a diagnostic device of the nuclear reactor protection apparatus.
Figure 9:
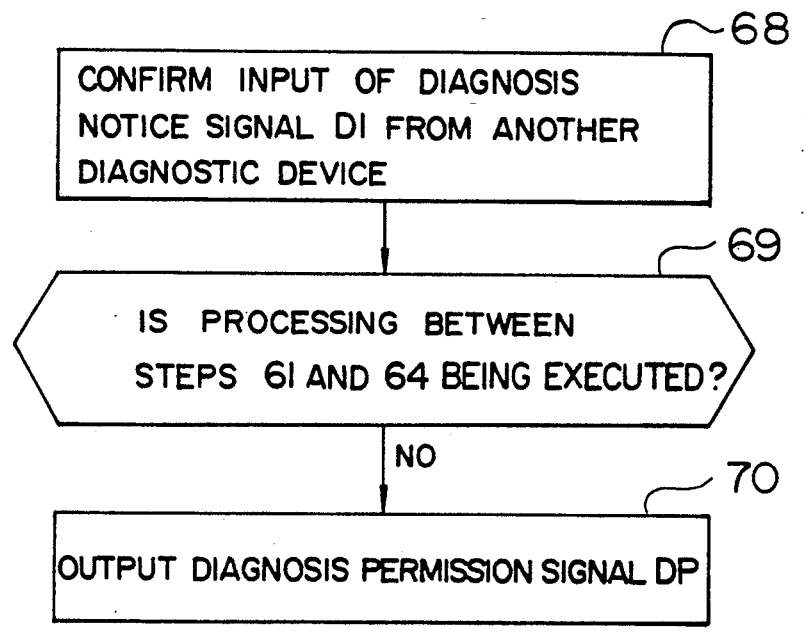
FIG. 9 is a flow chart showing the processing procedure of interrupt processing executed in the diagnostic device shown in FIG. 1.

In the diagnostic device 4A, processing procedures shown in FIGS. 8 and 9 are stored beforehand in the ROM 5B. The processing procedure of main processing comprises steps 58 to 67 shown in FIG. 8. The processing procedure of interrupt processing comprises steps 68 to 70 shown in FIG. 9. In each of diagnostic devices 4B to 4D as well, the processing procedures shown in FIGS. 8 and 9 are stored beforehand into the ROM 5B.

Since the control units 1A to 1D function in the same way, the operation will now be described by taking the control unit 1A as an example. When the control unit 1A is not in the diagnostic state, i.e., the control unit 1A is in such a state (hereafter referred to as control state) that the output signal a of the controller 2A may be directly conveyed to the signal selection device 20, movable terminals 8C of the changeover switches $6A_1$ to $6A_n$ and 7A are connected to their respective fixed terminals 8A. Data $S_1$ to $S_n$ representing the process state quantities detected by the sensors $S_1$ to $S_n$ are inputted to the controller 2A via the changeover switches $6A_1$ to $6A_n$. In case the data $S_1$ to $S_n$ include an analog signal, the analog signal is converted into an digital signal by a analog-digital converter (not illustrated) and then inputted to the control unit 1A.

Figure 7:
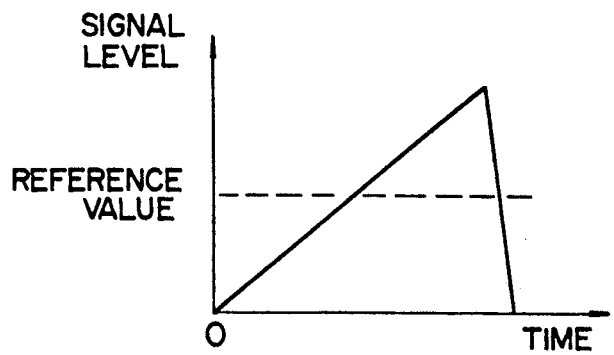
FIG. 7 is a diagram used for explaining the output signal of a sensor and the judgment reference value of the controller shown in FIG. 3.

The CPU 3A of the controller 2A executes processing in accordance with the processing procedure of FIG. 6 called from the ROM 3C. That is to say, when the control unit 1A is in the control state, a switch closing signal CH is not inputted, and hence the data $S_1$ to $S_n1$ to $S_n$ are inputted and stored temporarily into the RAM 3B at step 52. Each of data $S_1$ to $S_n$ is then compared with a reference value (which is a voltage of 5 V) at step 53. It is thus judged whether each data exceeds the reference value or not (step 54). The above described reference value is a logic "1". If the judgment result of the step 54 is "NO", processing of step 55 is performed. If the judgment result of the step 55 is "YES", processing of the step 56 is performed. If the judgment at the step 54 is "NO", processing at step 55 is performed. If the judgment at the step 54 is "YES", processing at step 56 is performed. If the data $S_1$ (analog quantity) changes as represented by solid lines of FIG. 7, the output signal a of the controller 2A becomes a logic "0" by the processing at the step 56. The solid lines of FIG. 7 represent states of the data $S_1$ where the data $S_1$ is not converted into digital signals.

If at least two output signals among the output signals a to d of the control units become logic "0"s when respective control units are in the control state, the output signal Z of the signal selection device 20 expressed by the equation (1) becomes a logic "0". That is to say, the voltage applied to the power supply terminal 22 becomes prevented from being applied to the excitation coil (not illustrated) of the electromagnetic valve 23, the excitation coil being thus changed from the exciting state to the nonexciting state. When the excitation coil is in the exciting state, the electromagnetic valve 23 is fully opened. When the excitation coil is in the non exciting state, the electromagnetic valve 23 is fully closed. Each relay contact of the signal selection device 20 is opened when the output signal of the corresponding control unit is a logic "0". Each relay contact of the signal selection device 20 is closed when the output signal of the corresponding control unit is a logic "1".

When the electroagnetic valve 23 is opened, operating air pressurized by the piping 24 fully opens the scram inlet valve and the scram outlet valve. Therefore, a piston of a control rod driving device is rapidly raised by high pressure water contained in an accumulator. The control rod is thus rapidly inserted into the reactor core.

Operation performed in the control unit 1A when the diagnostic devices 4A makes a diagnosis of the controller 2A will now be described.

The CPU 5A of the diagnostic device 4A executes processing in accordance with the processing procedures of FIGS. 8 and 9 called from the ROM 5B. Data inputted from the outside and data obtained by executing the processing are stored into the RAM 5C. First of all, the CPU 5A outputs a diagnosis notice signal DI at step 58. This diagnosis notice signal DI includes a signal indicating the address of a diagnostic device which outputs the diagnosis notice signal. The diagnosis notice signal DI outputted from the diagnostic device 4A is inputted to respective diagnostic devices of the control units 1B, 1C and 1D via the wiring 18A. The diagnosis notice signal DI is a signal for giving a previous notice of intention of starting a diagnosis. It is judged at step 59 whether the diagnosis notice signals DI outputted from the diagnostic devices 4B, 4C and 4D are inputted or not. If the decision is "NO" at step 59, processing of step 60 is executed. If a diagnosis permission signal DP is not returned from all of other diagnostic devices with respect to the output of the diagnosis notice signal DI in the present embodiment, the decision at the step 60 becomes "NO".

How the diagnosis permission signal DP is outputted with respect to the input of the diagnosis notice signal DI will now be described by taking the diagnostic device 4A as an example. In other diagnostic devices as well, the similar operation is executed. If the diagnosis notice signal DI is inputted from another diagnostic device, the CPU 5A of the diagnostic device 4A temporarily stops execution of the main processing of FIG. 8 and executes the processing of FIG. 9 by using interrupt processing. That is to say, input of the diagnosis notice signal DI is confirmed (step 68). It is judged whether the diagnostic device 4A is executing the processing between steps 61 and 64 of FIG. 8 or not (step 69). When the decision at step is "NO", i.e., when it is judged that the diagnostic device 4A is not making a diagnosis of the controller 2A, the diagnostic device 4A outputs a diagnosis permission signal DP including its own address signal and an address signal of the other diagnostic device which has outputted the diagnostic notice signal DI. This diagnosis permission signal DP is conveyed to other diagnostic devices via the wiring 18A.

Figure 10:
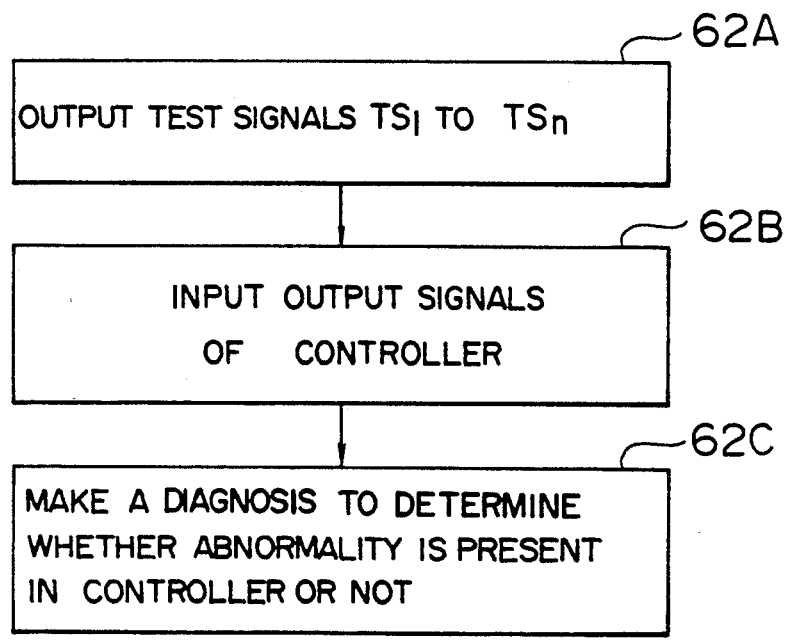
FIG. 10 is a flow chart showing the detailed processing procedure of step 62 illustrated in FIG. 8.
Figure 11:
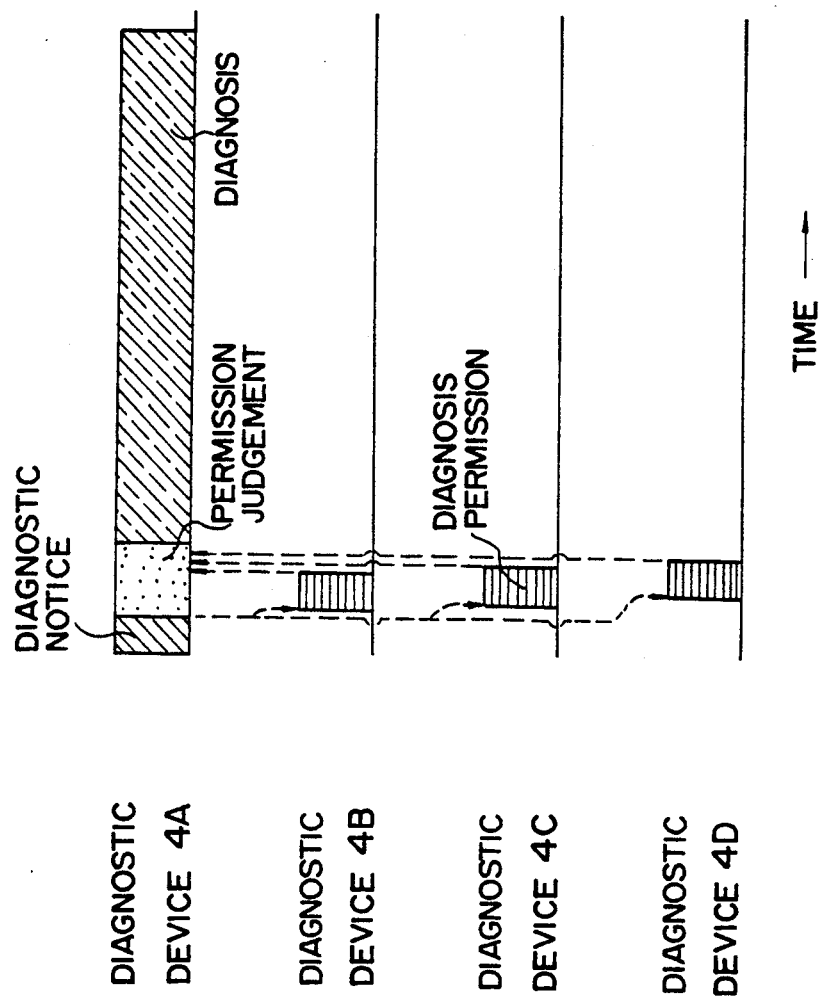
FIGS. 11 to 13 are time series diagrams of modes of the diagnostic device at the time when the processing procedure of FIG. 8 is executed.

The diagnostic device 4A receives only the diagnosis permission signal DP including its own address signal. If the decision at the step 60 is "YES", the step 61 is executed. A switch closing signal CH outputted from the diagnostic device 4A is conveyed to the changeover switches $6A_1$ to $6A_n$ and 7A. As a result, the movable terminal 8C of each changeover switch is disconnected from its fixed terminal 8A and connected to its fixed terminal 8B. The switch closing signal CH is inputted to the controller 2A as well. Thereafter, diagnosis of the controller 2A is executed (step 62). As shown in FIG. 10, the step 62 comprises steps 62A to 62C. The diagnostic device 4A outputs test signals $TS_1$ to $TS_n$ to the controller 2A via the wiring $13A_1$ to $13A_n$. The controller 2A receiving the switch closing signal CH executes processing of step 57 because the decision at step 51 is "YES". The test signals $TS_1$ to $TS_n$ are pulse signals each comprising a logic "0" and a logic "1". The diagnostic device 2A outputs the test signals $TS_1$ to $TS_n$ to yield a predetermined combination of "0" and "1". As a result of the steps 54, 55 and 56, the controller 2A outputs a logic "1" when all of the test signals $TS_1$ to $TS_n$ are logic "0"s. The controller 2A outputs a logic "0" when at least one of the test signals $TS_1$ to $TS_n$ is a logic "1". The output signal of the controller 2A is inputted to the diagnostic device 4A via the wiring 15A (step 62B). On the basis of the output signal of the controller 2A thus inputted, the diagnostic device 4A make a diagnosis to determine whether abnormality is present in the controller 2A or not (step 62C). FIG. 11 shows the processing heretofore described relative to other diagnostic devices in a time series fashion. The above described diagnosis is made to judge whether the output signal of the controller 2A is a logic "1" or not when all of the test signals $TS_1$ to $TS_n$ are logic "0"s and whether the output signal of the controller 2A is a logic "0" or not when at least one of the test signals is a logic "1". When the decision is "NO", the controller 2A is in an abnormal state. After the processing of the step 62C has been finished, the diagnostic device 4A outputs the result of diagnosis to the display device 16 at the step 73. This diagnosis result is displayed on the display device 16. A switch opening signal CO outputted from the diagnostic device 4A is outputted to the changeover switches $6A_1$ to $6A_n$ and 7A at step 64. At this time, the movable terminal 8C of each changeover switch is connected to its fixed terminal 8A. Therefore, the control unit 1A is restored from the diagnosis state to the control state. After the switch opening signal CO has been outputted, the diagnostic device 4A stays in a waiting state for a predetermined time TC. For the predetermined time TC, the control unit 1A is held in the control state. On the basis of the output of the timer 5D the CPU 5A judges whether the predetermined time TC has elapsed or not. The timer 5D has functions of pulse transmission means and counter means which will be described later. When the predetermined time TC has elapsed, the diagnostic device 4A executes the processing of the step 58 to make a diagnosis of the controller 2A. The diagnostic devices 4A to 4D are different from each other in length of the predetermined time TC. In each diagnostic device, a time sufficiently longer than the time required for the main processing of FIG. 8 (and especially the diagnosis time) is set as the predetermined time TC in order to prevent one diagnostic device from coming into the diagnosis starting state immediately after the diagnostic device has completed the diagnosis and in order to decrease the number of times when the diagnosis notice signals DI are simultaneously outputted from respective diagnostic devices. Therefore, opportunity of diagnosis is given to all diagnostic devices.

Figure 12:
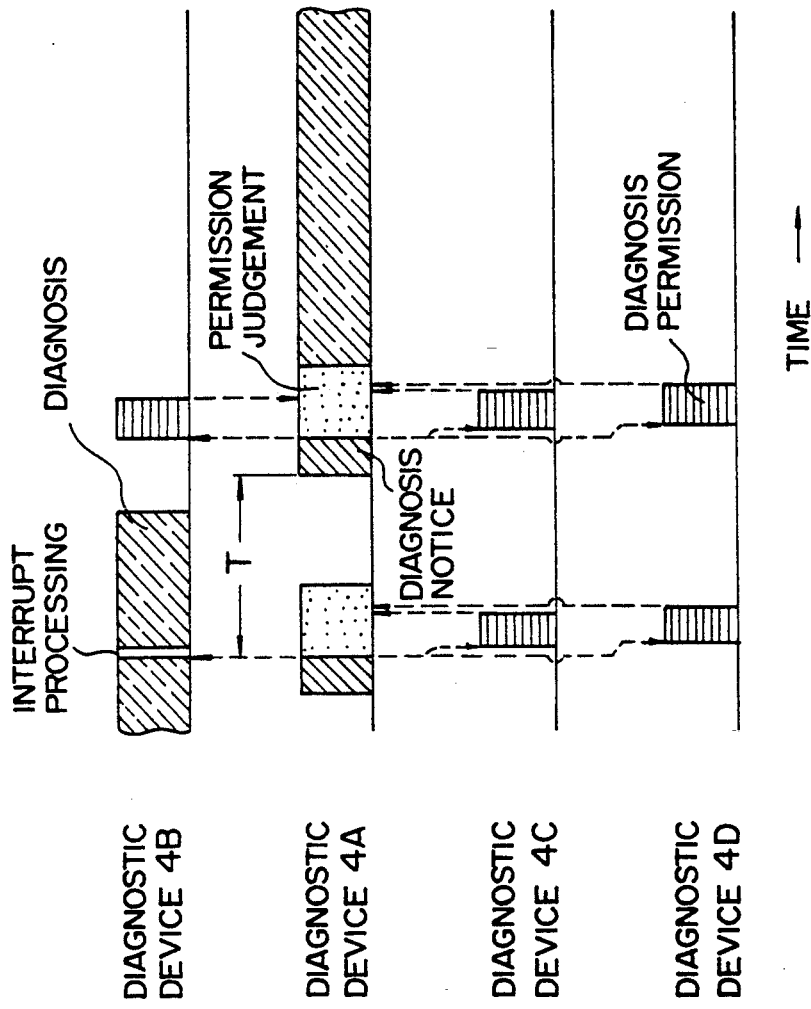

There will now be described a case where the diagnosis permission signal DP is not returned from all of other diagnostic devices after the diagnosis notice signal DI has been outputted from the diagnostic device 4A. For example, it is now assumed that the diagnostic device 4B is making a diagnosis as shown in FIG. 12. In this case, the diagnostic device 4A judges "NO" at the step 60, and executes processing of step 66. As a result of the step 66, the diagnostic device 4A does not make a diagnosis for a predetermined time T. It is judged whether the predetermined time T has elapsed or not on the basis of the output of the timer 5D in the same way as the predetermined time TC. The predetermined time T is considerably shorter than the predetermined time TC. After the predetermined time T has elapsed, the processing of the step 58 is executed again. If the decision at the step 59 is "NO" and the decision at the step 60 is "YES", the processing of the steps 61 to 64 and 67 is executed as described before. This state is shown as the diagnosis notice of the second time and on in FIG. 12.

Figure 13:
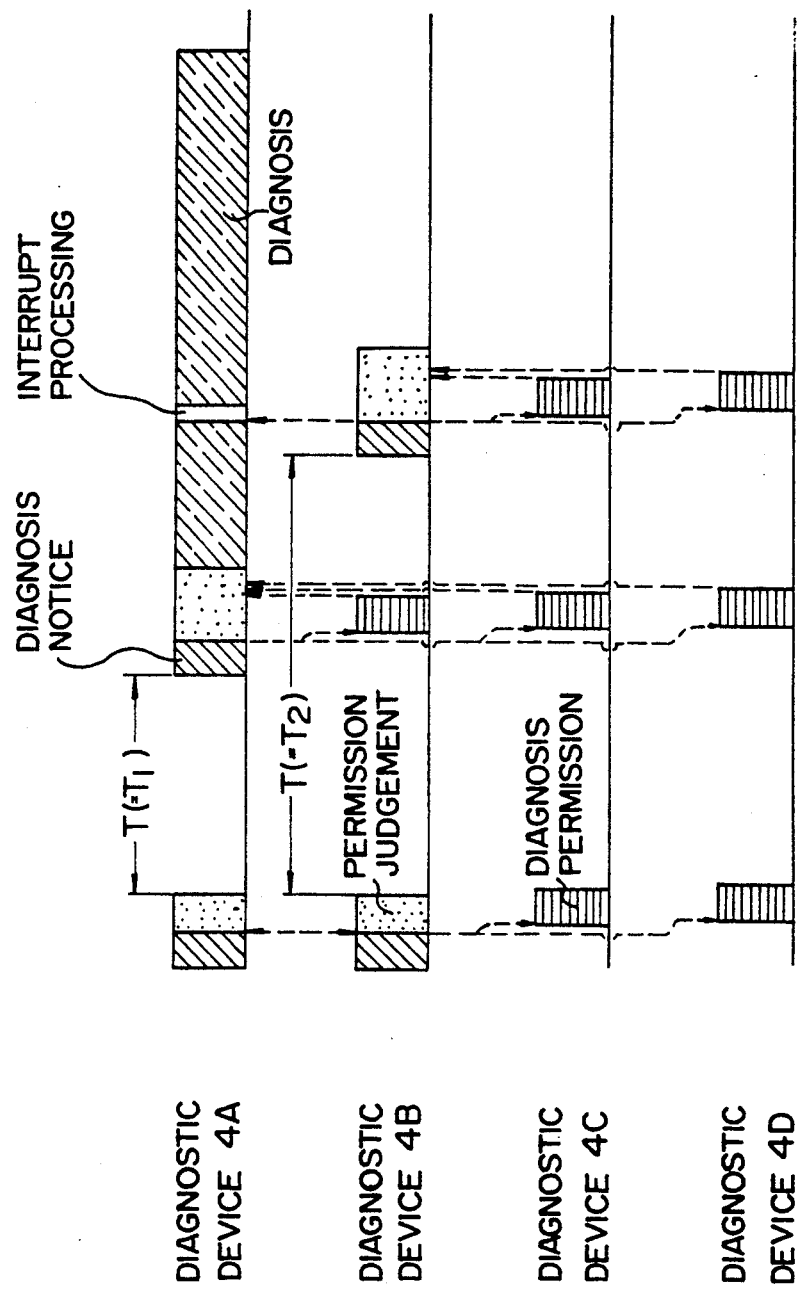

The case where the decision of the step 59 is "YES" will now be described. If the decision at the step 59 is "YES", the diagnosis permission signal DP is prevented at step 65 from being outputted from the diagnostic device 4A. While the step 59 is being executed, the diagnostic device 4A does not execute the processing of the steps 61 to 64. In case the diagnosis notice signal DI is inputted from another diagnostic device after the processing of the step 58, therefore, the diagnostic device 4A outputs the diagnosis permission signal DP by the above described interrupt processing. As a result, there is a fear that a predetermined number of or more control units simultaneously come into the diagnosis state and the original function as the nuclear reactor protection apparatus is hampered. The step 65 is provided in order to eliminate the problem. In case the step 65 has been executed, the diagnostic device 4A does not execute the step 58 again as a result of the step 66 unless the predetermined time T elapses. The diagnostic devices 4A to 4D are different from each other in length of the predetermined time T in order to prevent different diagnostic devices from outputting the diagnosis notice signals DI simultaneously again. Therefore, each diagnostic device can suitably make a diagnosis. As shown in FIG. 13, the predetermined time T is set at $T_1$ in the diagnostic device 4A and set at $T_2$ ($>T_1$) in the diagnostic device 4B. Therefore, the step 58 is reexecuted earlier in the diagnostic device 4A having higher priority a compared with the diagnostic device 4B. Thereafter in the diagnostic device 4A, the decision becomes "NO" at the step 59 and "YES" at the step 60, and processing of the steps 61 to 64 and 67 is successively executed. In the diagnostic device 4B, however, the decision becomes "NO" at the step 59 and "NO" at the step 60 because the diagnostic device 4A is making a diagnosis. In the diagnostic device 4B, therefore, the processing of the step 61 and the succeeding steps is not executed. This state is shown in FIG. 13. If the decision at the step 60 becomes "NO", processing of the step 66 is executed. If the diagnostic device 4B makes a diagnosis immediately when the decision at the step 60 becomes "NO", processing of the steps 58, 59 and 60 must be repeated many times until the decision at the step 60 becomes "YES", resulting in useless processing. By executing the step 66, however, the number of times when useless processing of the steps 58 to 60 is executed is significantly reduced.

Since an exclusive diagnostic device is provided for each of the redundant controllers in the present embodiment, the above described problems caused by the configuration described in U.S. Pat. No. 4,517,154 can be eliminated. Before making a diagnosis of the corresponding controller, a diagnostic device of the present embodiment outputs the diagnosis notice signal DI and monitors the states of other diagnostic devices (such as the diagnosis state or non-diagnosis state). In case another control unit is in the diagnosis state, the diagnostic device does not make a diagnosis of the corresponding controller. Even if one control unit is brought into the diagnosis state, therefore, three other control units can be held in the control state in the present embodiment. Output signals of two or more controllers required to perform normal signal selection are inputted to the signal selection device 20 comprising the 2 out of 4 logic circuit. Therefore, even if a diagnosis is made of a controller of a control unit in the present embodiment, there is avoided a state where the signal selection function of the signal selection device 20 is hampered (such as a state where a diagnosis is made of three or more controllers). Control of the electromagnetic valve 23 to be controlled on the basis of the process state quantities detected from the plant is not hampered by the diagnosis function. This results in a raised rate of operation of a multicontroller apparatus. Effects heretofore described are derived in a state where the diagnostic devices 4A to 4D are asynchronous. That is to say, the above described effects are derived on the basis of the fact that each diagnostic device automonously judges whether it can make a diagnosis of the corresponding controller or not. By making the diagnostic devices 4A to 4D synchronous as well, the above described effects can be obtained. In this case, however, a synchronizer becomes necessary and the structure of a multicontroller apparatus becomes complicated. Further, since the synchronizer is in the common mode, three or more controllers may simultaneously come into the diagnosis state as a result of an abnormality in the synchronizer and hence control of the electromagnetic valve 23 on the basis of the detected process state quantities tends to be hampered. Since a diagnostic device in the present embodiment autonomously judges whether the diagnostic device can make a diagnosis of a controller or not on the basis of result of monitoring other diagnostic devices (i.e., on the basis of the result of judgment at the step 60) as described before, the problems caused when a synchronizer is provided can be eliminated.

Further, in the present embodiment, states of other control units are judged on the basis of answer signals which are outputted by diagnostic devices of other control units in response to the diagnosis notice signal outputted by a diagnostic device making a diagnosis. Therefore, it is possible to accurately grasp the states of other control units at the time of diagnosis notice by the diagnostic device. It is thus possible to judge with precision whether the diagnostic device can make a diagnosis or not.

The diagnosis notice signal DI and the diagnosis permission signal DP are pulse signals comprising a logic "0" and a logic "1". Even if a certain diagnostic device breaks down and the signals DI and DP degenerate to a logic "0" or a logic "1", therefore, each diagnostic device can autonomously execute state monitoring between diagnostic devices without being affected by the degeneration.

In the present embodiment, the following effects can be obtained because of existence of the changeover switch 7A. When a test signal is inputted to a controller, an answer signal with respect to the test signal is not transmitted from the controller to the signal selection device 20. Further, when a diagnosis is made of a controller, a settled signal is applied to the signal selection device 20 to change the signal selection logic of the signal selection device (to 2 out of 3 logic, for example, reliability of the multicontroller apparatus as a whole being thus assured.

Figure 14:
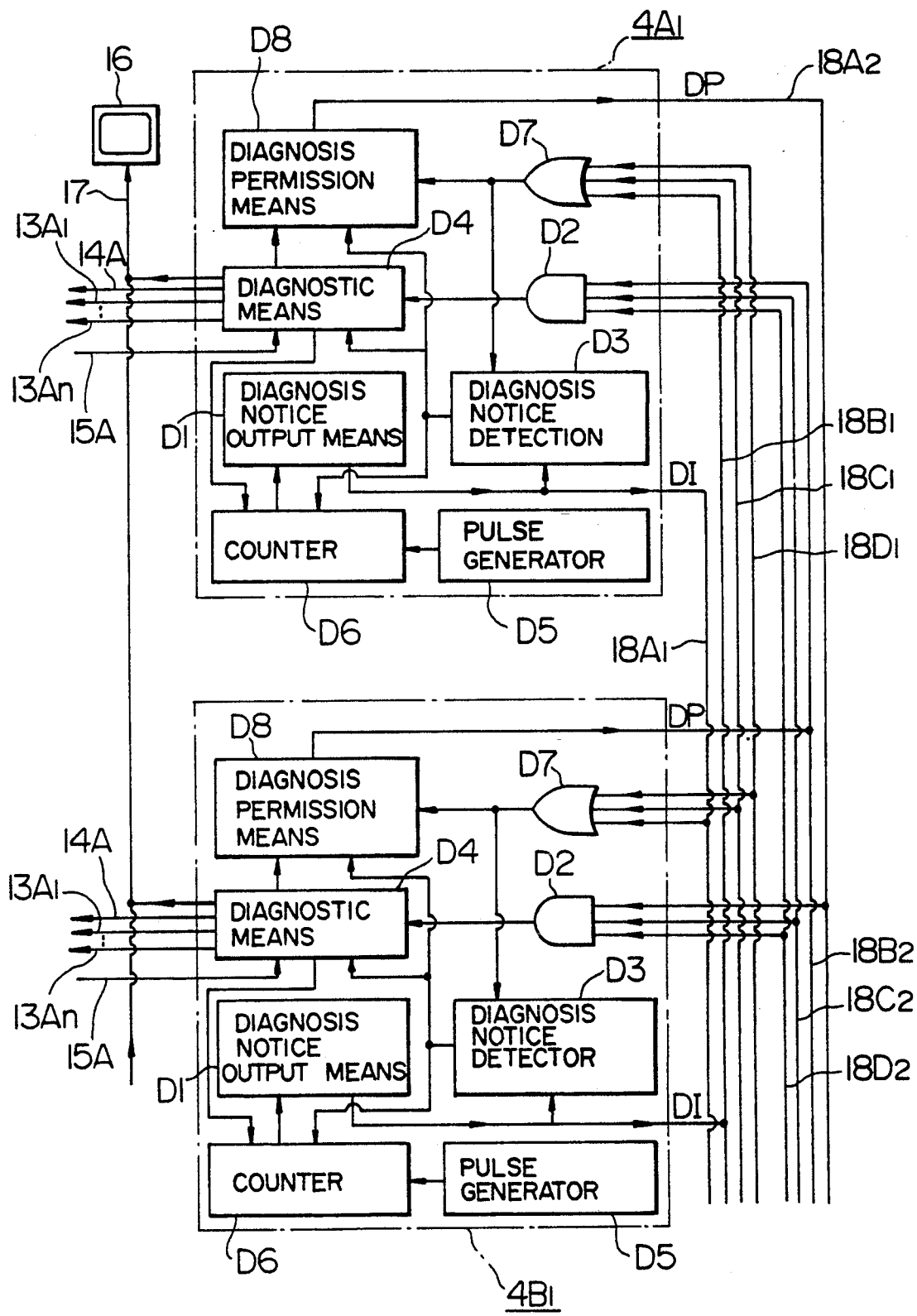
FIG. 14 is a diagram used for explaining the function of the diagnostic device executing the processing procedure of FIG. 8.

Diagnostic devices $4A_1$ and $4B_1$ shown in FIG. 14 represent functionally the diagnostic devices 4A and 4B of the present embodiment heretofore described, respectively. The diagnostic devices 4C and 4D can also be represented in the same way. The diagnostic device $4A_1$ will now be described. In the diagnostic device $4A_1$, pulses outputted from pulse generation means D5 are counted by counter means D6. When the count in the counter means D6 has reached a first predetermined count (corresponding to the predetermined time TC) or a second predetermined count (corresponding to the predetermined time T), the counter means D6 outputs a signal to diagnosis notice output means D1. When a diagnosis end signal is inputted from diagnostic means D4 to counter means D6, the counter means D6 outputs a signal corresponding to the predetermined time TC. When diagnosis notice detection means D3 has detected the diagnosis notice signal DI outputted from another diagnostic device or an AND circuit D2 outputs a logic "0", the counter means D6 outputs a signal corresponding to the predetermined time T. The diagnosis notice output means D1 receives the above described signal and outputs the diagnosis notice signal DI to OR circuits D7 of other diagnostic devices via wiring 18A$_1$. Diagnosis notice signals DI outputted from other diagnostic devices are inputted to the OR circuit D7 via wiring 18B$_1$, 18C$_1$ and 18D$_1$.

Figure 15:
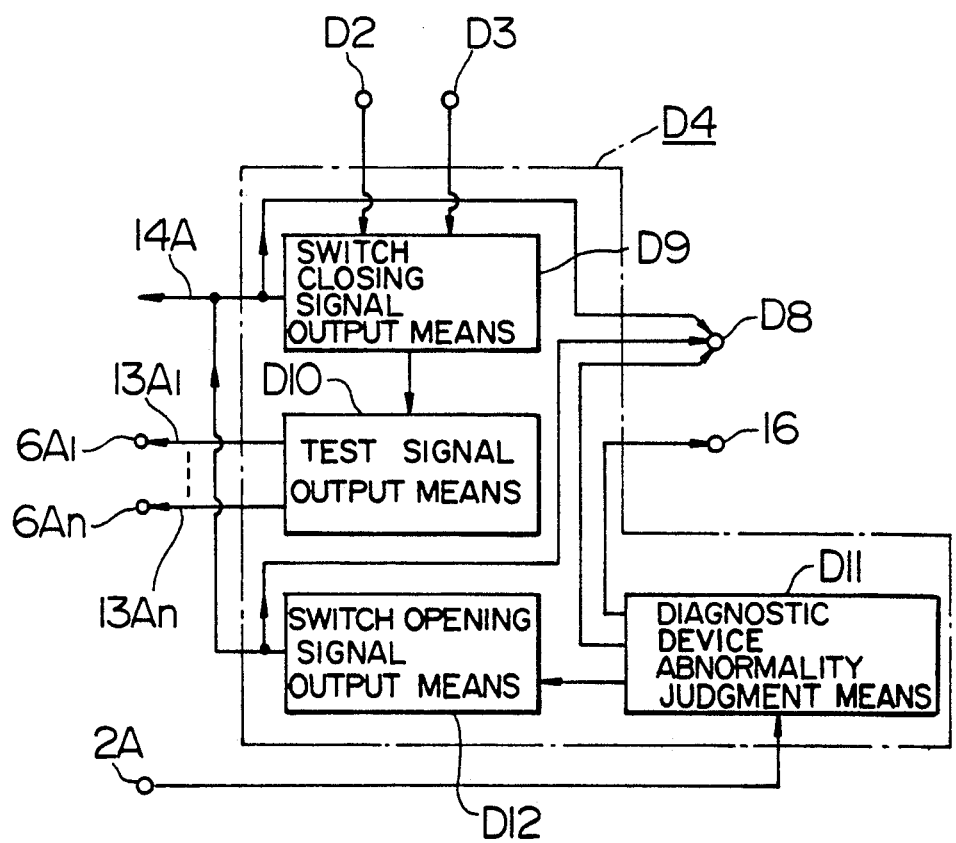
FIG. 15 is a diagram used for explaining the detailed function of the diagnostic means illustrated in FIG. 14.

When the diagnosis notice signal DI is outputted from the diagnosis notice output means D1 of the diagnostic device 4A$_1$, the diagnosis notice detection means D3 judges whether the diagnosis notice signal DI outputted from another diagnostic device has been outputted from the OR circuit D7. When diagnosis permission signals DP (logic "1"s) outputted from all of other diagnostic devices in response to the diagnosis notice signal DI outputted by the diagnosis notice output means D1 are inputted to the AND circuit D2 via wiring 18B$_2$ to 18D$_2$, the AND circuit D2 outputs a signal representing that fact. The AND circuit D2 is means for judging states of other control units. That is to say, when signals DP from all diagnostic devices are inputted to the AND circuit D2, the AND circuit D2 judges all of other control units to be in the control state. When the diagnosis notice detection means D3 judges the diagnosis notice signal DI is not outputted from any other diagnostic device and the AND circuit D2 detects the fact that the diagnosis permission signals DP are outputted from all other diagnostic devices, the diagnostic means D4 makes a diagnosis of the corresponding controller 2A. The detailed function of the diagnostic means D4 is shown in FIG. 15. When the above described signals are outputted from the AND circuit D2 and the diagnosis notice detection means D3, switch closing signal output means D9 outputs the switch closing signal CH on the wiring 14A in order to make a diagnosis of the pertinent controller 2A. Thereafter, test signal output means D10 outputs the test signals TS$_1$ to TS$_n$. Abnormality judgment means D11 receives answer signals outputted by the controller 2A in response to the test signals and judges whether an abnormality is present in the controller 2A or not. When the judgment performed by the abnormality judgment means D11 is finished, switch opening signal output means D12 outputs the switch opening signal CO. When a diagnosis notice signal DI of another diagnostic device is inputted under the condition that the diagnstic means D4 is not functioning, diagnosis permission means D8 outputs the diagnosis is permission signal DP onto wiring 18A$_2$. If the diagnosis notice detection means D3 judges the diagnosis notice signal DI outputted from another diagnostic device is inputted while its own diagnostic device is outputting the diagnosis notice signal DI, the diagnosis permission means D8 prevents the diagnosis permission signal DP from being outputted. The wiring 18A comprises the wiring 18A$_1$ and 18A$_2$. In the same way, a symbol having no suffix shown in FIG. 1 denotes the same wiring as that denoted by the same symbol having a suffix shown in FIG. 14.

The counter means D6 and the pulse transmission mean D5 correspond to the timer 5D. The diagnosis notice output means D1 corresponds to the processing of the step 58. The diagnosis notice detection means D3 corresponds to the processing of the step 59, and the AND circuit D2 corresponds to the processing of the step 60. The diagnostic means D4 corresponds to the processing of the steps 61, 62, 63 and 64. The OR circuit D7 corresponds to the step 68, and the diagnosis permission means D8 corresponds to the steps 69 and 70.

The step 70 of FIG. 9 may be replaced by "OUTPUT DIAGNOSIS NONPERMISSION SIGNAL DN" under the condition that this diagnosis nonpermission signal DN is outputted when the decision at the step 69 is "NO". In this case, judgment at the step 60 of FIG. 8 is replaced by "IS DIAGNOSIS NONPERMISSION SIGNAL DN INPUTTED FROM ANOTHER DIAGNOSTIC DEVICE?". If the decision is "NO" processing proceeds to the step 61. If the decision is "YES", processing proceeds to the step 66.

Figure 1:
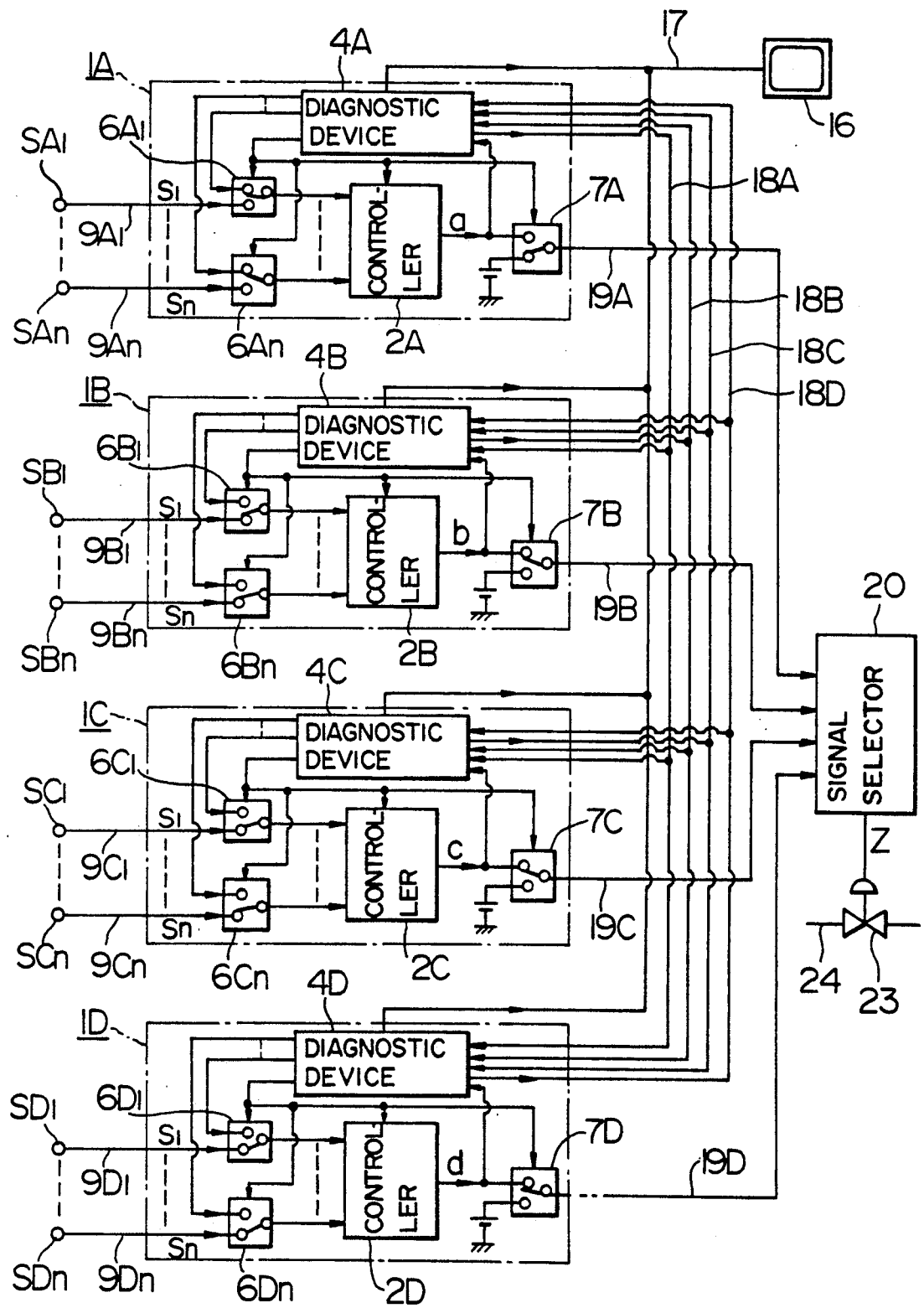
FIG. 1 is a configuration diagram of a nuclear reactor protection apparatus according to a preferred embodiment of the present invention.
Figure 16:
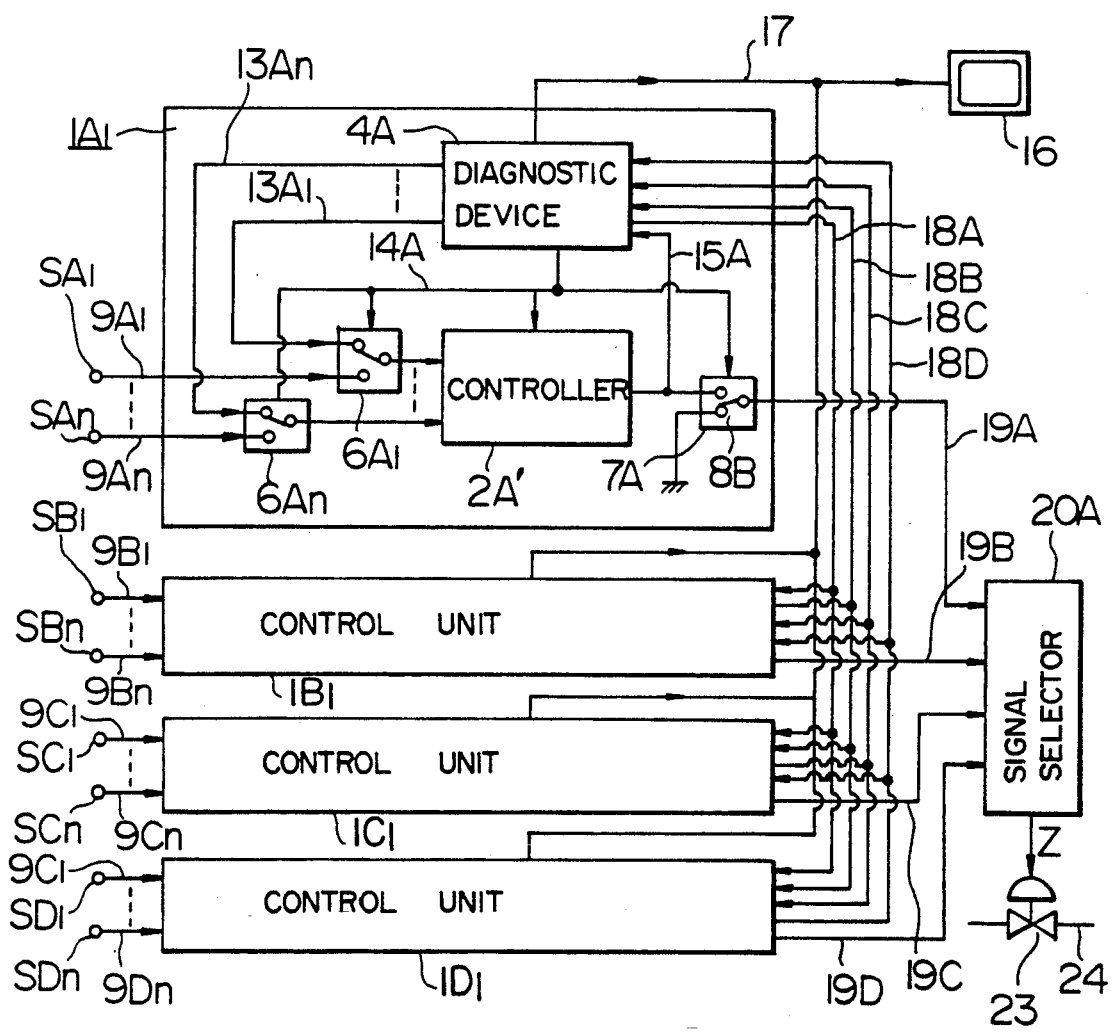
FIGS. 16, 20 and 30 to 33 are configuration diagrams of other embodiments of the present invention.

The embodiment heretofore described is a nuclear reactor protection apparatus comprising a logic circuit of 2 out of 4 logic with a logic "0" dominant. However, a nuclear reactor protection apparatus having a logic circuit of 2 out of 4 logic with a logic "1" dominant can also be configured. FIG. 16 shows this embodiment. The same components as those of the embodiment shown in FIG. 1 are denoted by like symbols. The present embodiment differs from the embodiment of FIG. 1 in that the fixed terminal 8B of the changeover switch 7A is directly grounded and the processing procedure stored in the ROM 3C of the controller 2A' is changed so that the step 55 of FIG. 6 may be represented as "MAKE OUTPUT SIGNAL A "0"" and the step 56 may be represented as "MAKE OUTPUT SIGNAL A "1"". A control unit 1A$_1$, of the present embodiment is configured as described above. Control units 1B$_1$, 1C$_1$ and 1D$_1$ are also configured in the same way as the control unit 1A$_1$. Further, in the present embodiment, a signal selection device 20A is used. The signal selection device 20A is configured as shown in FIG. 5. Respective relays are closed by output signals a to d of a logic "0" and opened by output signals a to d of a logic "1".

In the present embodiment, a signal of a logic "0" is conveyed to the signal selection device 20A when the movable terminal 8C of the changeover switch 7A is connected to its fixed terminal 8B.

Logic configuration of the signal selection device 20A in the present embodiment is represented by the following logic equation.

$$Z = ab + ac + ad + bc + bd + cd \qquad (3)$$

In such present embodiment as well, the same effect as that of the embodiment of FIG. 1 having the processing procedure shown in FIG. 8 can be obtained.

Figure 17:
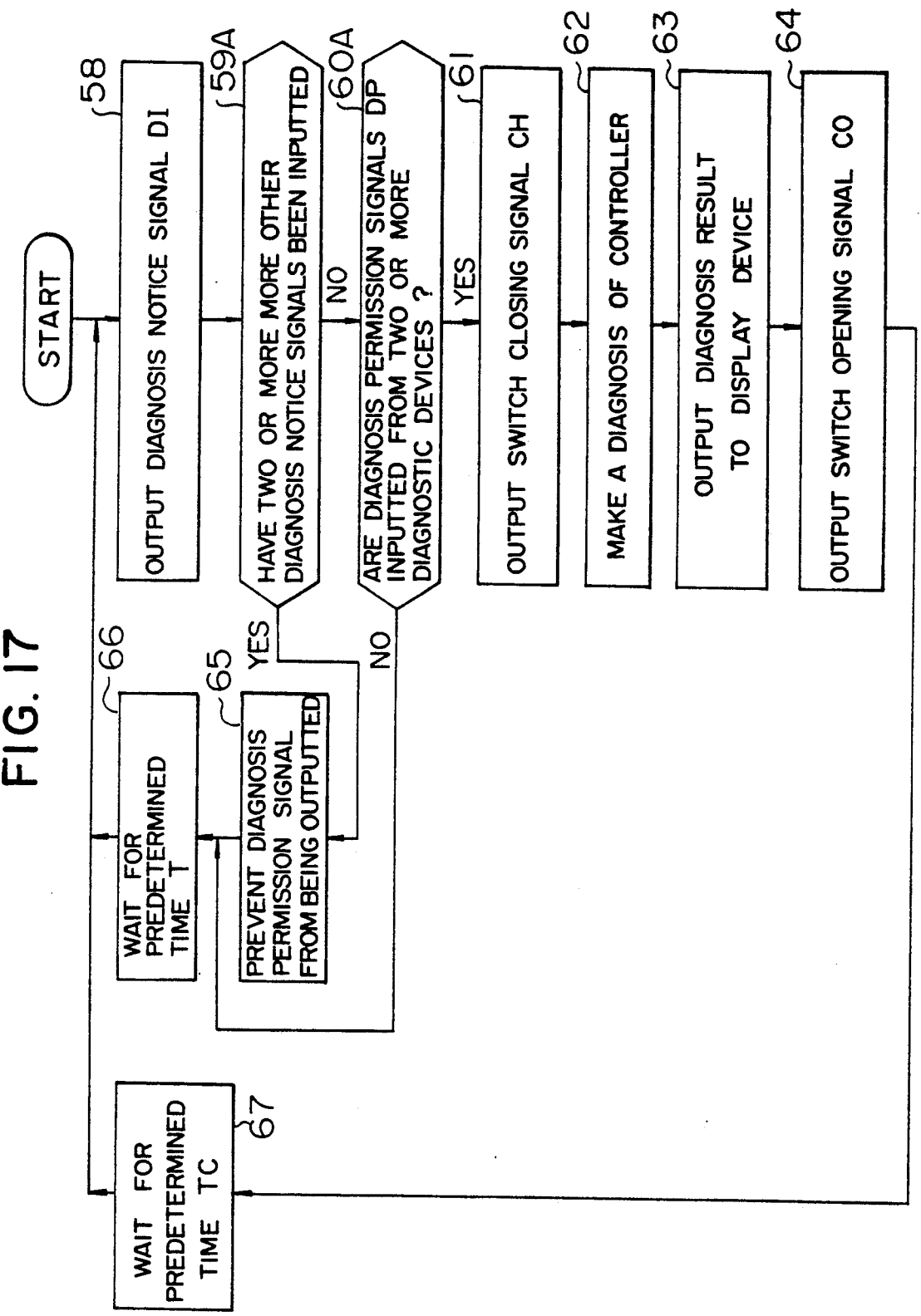
FIGS. 17, 18., 21, 23, 26 and 29 are flow charts of other embodiments of main processing executed in the diagnostic device shown in FIG. 2.

A nuclear reactor protection apparatus which is another embodiment of the present invention will now be described by referring to FIG. 17. In the present embodiment, the configuration of FIG. 1 is used, and the processing procedure of FIG. 17 is stored in the ROM 5B of each of the diagnostic devices 4A to 4D instead of the processing procedure of FIG. 8. It is a matter of course that the processing procedure of FIG. 9 is also stored into the ROM 5B in the present embodiment. In respective embodiments described before, diagnosis of remaining controllers is prevented when one out of four redundant controllers is in the diagnosis state. So long as the signal selection function of the signal selection device is not hampered, however, diagnosis, may be simultaneously made of a plurality of controllers. By doing so, the time required to make diagnosis of all controllers of a multicontroller apparatus can be shortened. The present embodiment satisfies such a demand. Since the signal selection device 20 has 2 out of 4 logic configuration in the present embodiment, it is allowed to make diagnosis of two controllers simultaneously.

The processing procedure to be executed in the present embodiment is obtained by replacing the steps 59 and 60 included in the steps of FIG. 8 with steps 59A and 60A, respectively. Processing of the present embodiment based upon the processing procedure of FIG. 17 will hereafter be described. After the step 58 has been executed in the present embodiment, the diagnostic device 4A judges at the step 59A whether two or more other diagnostic devices have outputted diagnosis notice signals DI or not. If the decision at the step 59A is "YES", the processing of the step 65 is executed. If the decision at the step 59 is "NO" (i.e., unless two or more other diagnostic devices are making diagnosis), processing of the step 60A is executed. If it is judged at the step 60A that two or more other diagnostic devices do not output the diagnosis permission signal DP, i.e., three or more other diagnostic devices are making diagnosis, processing proceeds to the step 66. If, on the contrary, it is judged at the step 60A that two or more other diagnostic devices output the diagnosis permission signal DP, processing of the step 61 and the succeeding steps is executed.

The present embodiment yields effects obtained in the embodiment of FIG. 1 in addition to the above described effects.

The diagnostic device 4 executing the processing procedure of FIG. 17 will hereafter be described from the viewpoint of its function. That is to say, the diagnosis notice detection means D3 included in the configuration of FIG. 14 is provided with the function of the step 59A, and the AND circuit D2 and the OR circuit D7 are replaced by signal selection means A and signal selection means B, respectively. The signal selection means A has function of the step 60A. When the signal selection means A judges "YES", the diagnostic means D4 is activated. The signal selection means B corresponds to the step 68. When the diagnosis notice signal DI is inputted from two or more other diagnostic devices among three other diagnostic devices, the signal selection means B outputs a signal indicating that fact. This signal is conveyed to the diagnostic means D4 and the diagnosis notice detection means D3.

Figure 18:
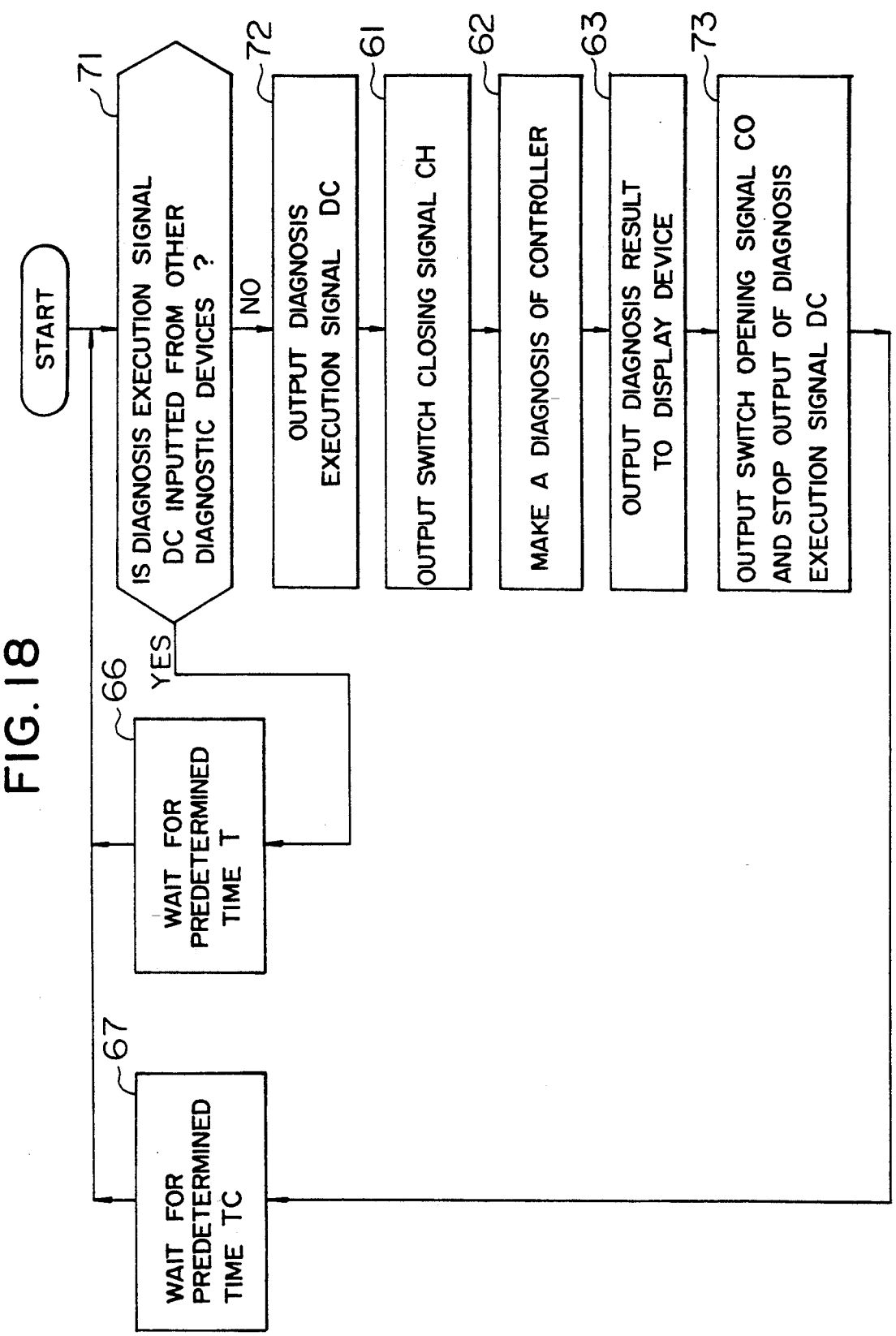

A nuclear reactor protection apparatus which is another embodiment of the present invention will now be described by referring to FIG. 18. In the present embodiment, the configuration of FIG. 1 is used, and the processing procedure shown in FIG. 18 is stored into the ROM 5B of the diagnostic devices 4A to 4D instead of the processing procedure of FIG. 8.

Operation of the present embodiment will now be described by taking the diagnostic device 4A as an example. First of all, the CPU 5A of the diagnostic device 4A calls the processing procedure stored in the ROM 5B and judges whether diagnosis execution signals DC outputted from other diagnostic devices have been inputted or not (step 71). If the decision at the step 71 is "YES", processing of the step 66 is executed. If the decision at the step 71 is "NO", the diagnostic device 4A outputs the diagnosis execution signal DC onto the wiring 18A. The diagnosis execution signal DC contains an address signal of the pertinent diagnostic device. If the decision at the step 71 is "NO", it is meant that none of the three other diagnostic devices ar not making diagnosis of corresponding controllers. In other words, it can be said that the controllers 2B to 2D are in the control state. Outputting the diagnosis execution signal DC from the diagnostic device 4A means notifying beforehand the diagnostic devices 4B to 4D of execution of diagnosis of the controller 2A by the diagnostic device 4A. If this diagnosis execution signal DC is outputted, the diagnostic devices 4B to 4D cannot make diagnosis of controllers associated with them until the diagnosis of the controller 2A is finished, i.e., the processing of the step 73 is completed. The diagnosis execution signal DC outputted from the diagnostic device 4A is conveyed to the diagnostic devices 4B to 4D via the wiring 18A. Diagnosis execution signals DC respectively outputted from the diagnostic devices 4B to 4D are conveyed to the diagnostic device 4A via the wiring 18B to 18D. After the processing of the step 72 has been executed, processing of the steps 61 to 63 is executed. Further, at step 73, the switch opening signal CO is outputted and outputting of the diagnosis execution signal DC is stopped. While the processing of the steps 72, 61 to 63 and 73 is being executed, the diagnosis execution signal DC is outputted.

In the present embodiment, each diagnostic device judges whether input of the diagnosis execution signal DC outputted from other diagnostic devices is present or not. Therefore, each diagnostic device can autonomously judge whether other diagnostic devices are making diagnosis of corresponding controllers or not. On the basis of this judgment, each diagnostic device in the present embodiment can automonously decide, in the same way as the embodiment of FIG. 1, whether a diagnosis can be made upon the controller which is under the control of the diagnostic device. In the present embodiment, therefore, the signal selection function of the signal selection device is not hampered even if a diagnosis is made of an arbitrary controller. Therefore, control of the electromagnetic valve 23 based upon the detected process state quantities is not hampered. Functions heretofore described are performed when the diagnostic devices 4A to 4D are in the asynchronous state. The above described effects caused by asynchronism are also obtained. The effects owing to the steps 66 and 67 are also obtained. Further, in the present embodiment, processing procedure can be simplified as compared with the processing procedure of FIG. 8, and the processing procedure of FIG. 9 becomes unnecessary.

In the present embodiment, the precision in grasping the states of other diagnostic devices when the diagnostic device starts diagnosis is lowered as compared with the embodiment of FIG. 1. This is because the diagnosis notice signal DI is not outputted and answer signals (such as the signal DP) outputted by other diagnostic devices in response to the diagnosis notice signal DI are not inputted.

In the same way as the step 59A of FIG. 17, the step 71 of the present embodiment may be changed to "ARE DIAGNOSIS EXECUTION SIGNALS DC INPUTTED FROM TWO OR MORE OTHER DIAGNOSTIC DEVICES?".

Figure 19:
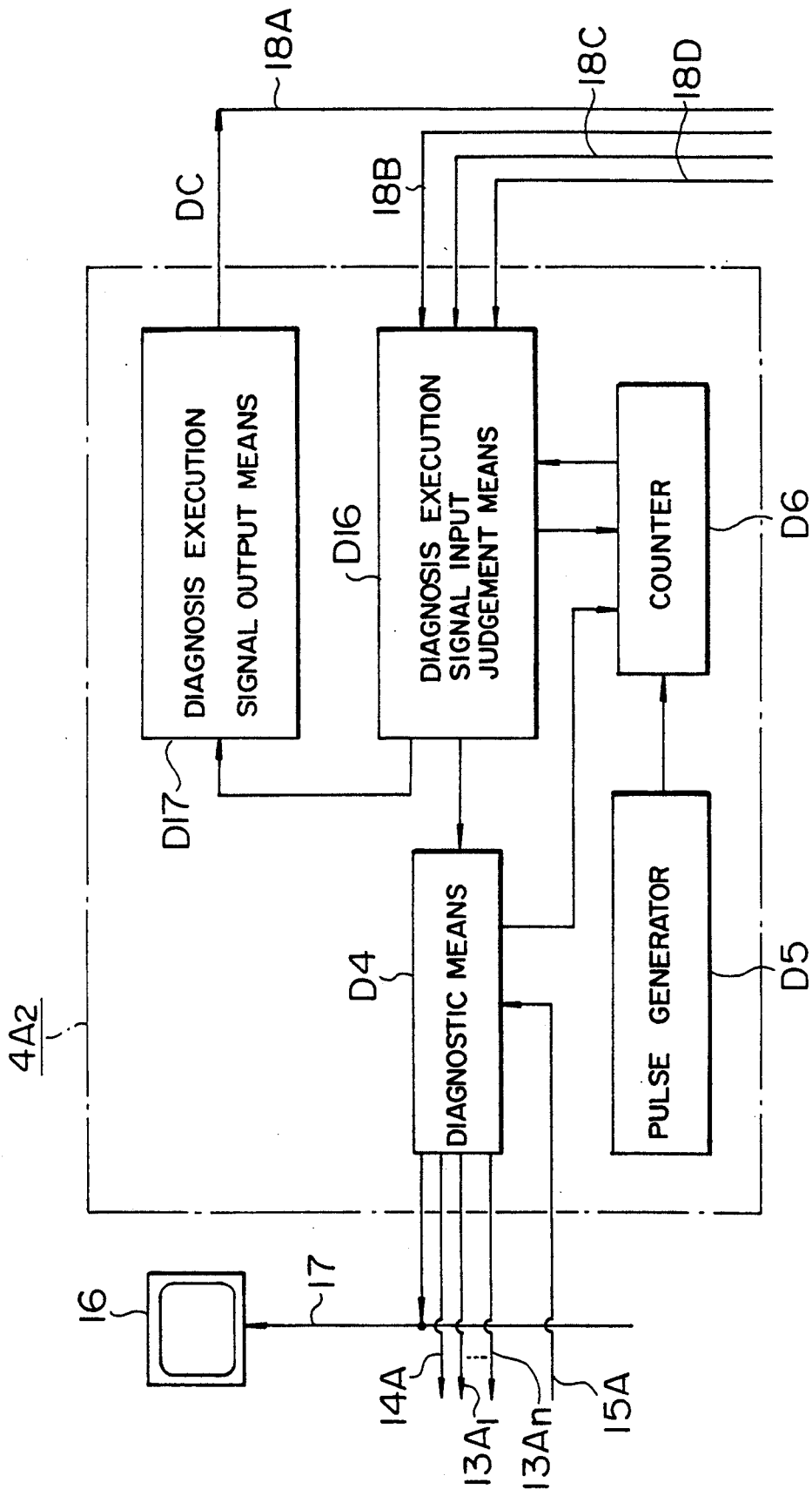
FIG. 19 is a diagram used for explaining the function of the diagnostic device of FIG. 2 executing the processing procedure of FIG. 18.

FIG. 19 is a functional representation of the diagnostic device 4A storing therein the processing procedure of FIG. 18. The diagnostic devices 4B to 4D can also be represented in the same way. The diagnostic device $4A_2$ functionally representing the diagnostic device 4A comprises the diagnostic means D4, the pulse generation means D5, the counter means D6, diagnosis execution signal input judgment means D16 and diagnosis execution signal output means D17. The diagnosis execution signal input judgment means D16 corresponds to the step 71 and judges whether the diagnosis execution signal DC outputted from another diagnostic device is inputted or not. When the diagnosis execution signal DC is not inputted, the diagnosis execution signal output means D17 outputs the diagnosis execution signal DC to the other diagnostic devices. The diagnosis execution signal output means D17 corresponds to the step 72.

Figure 20:
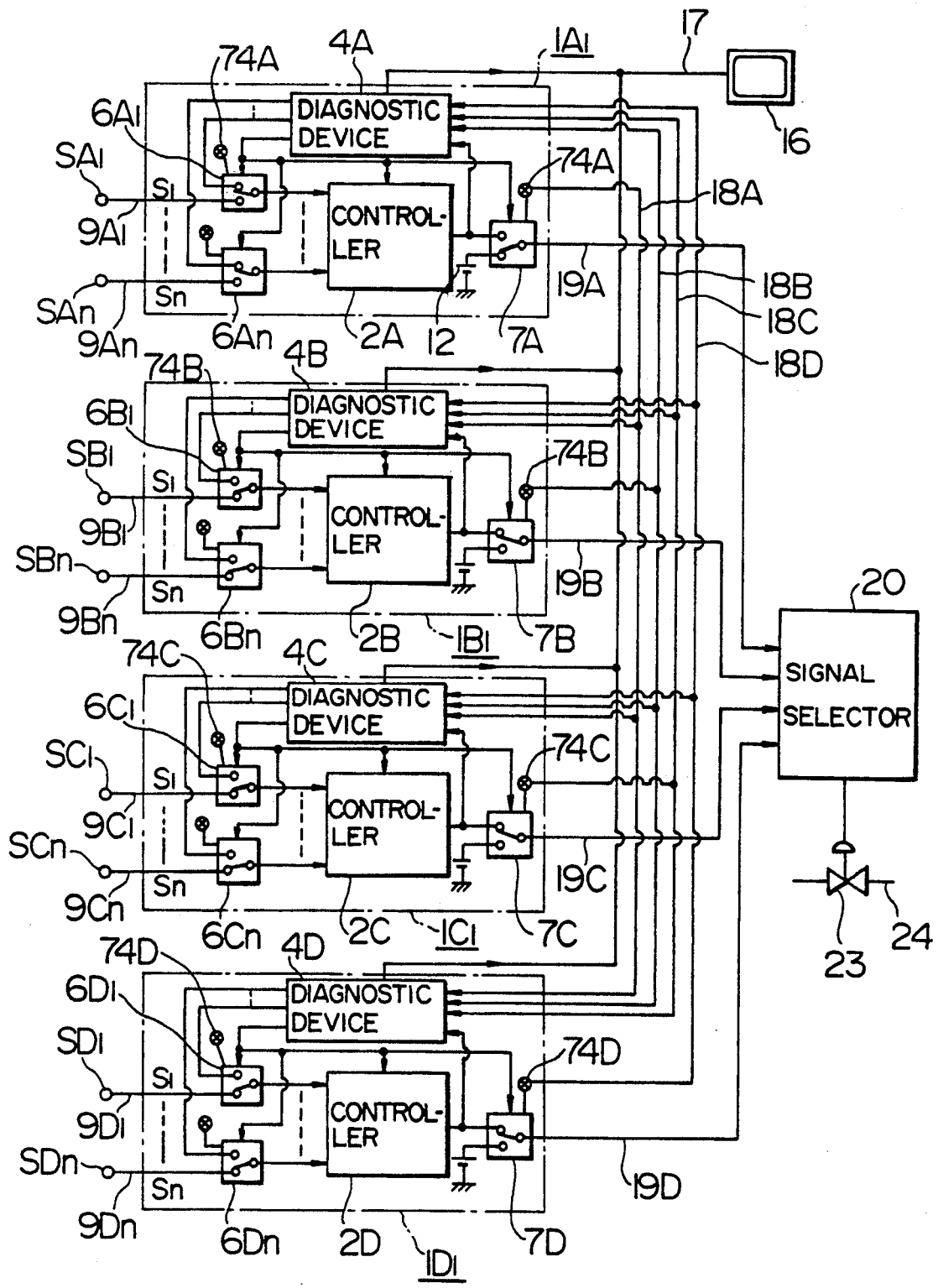

A nuclear reactor protection apparatus which is another embodiment of the present invention will now be described by referring to FIGS. 20 and 21. The present embodiment comprises four redundant control units $1A_1$ to $1D_1$. The control unit $1A_1$ comprises connection state detectors 74A in addition to the configuration of the control unit 1A of FIG. 1. The connection state detectors 74A are disposed in the changeover switches $6A_1$ to $6A_n$ and 7A. In the same way, the control unit $1B_1$ comprises connection state detectors 74B in addition to the control unit 1B of FIG. 1, and the control unit $1C_1$ comprises connection state detectors 74C in addition to the control unit 1C. The control unit $1D_1$ comprises connection state detectors 74D in addition to the control unit 1D. The connection state detectors 74B are disposed in the changeover switches $6B_1$ to $6B_n$ and 7B. The connection state detectors 74C are disposed in the changeover switches $6C_1$ to $6C_n$ and 7C. The connection state detectors 74D are disposed in the changeover switches $6D_1$ to $6D_n$ and 7D. Further, the connection state detectors 74A, the connection state detectors 74B, the connection state detectors 74C and the connection state detectors 74D are connected to the wiring 18A, 18B, 18C and 18D, respectively. The remaining configuration is the same as the configuration of FIG. 1.

Figure 21:
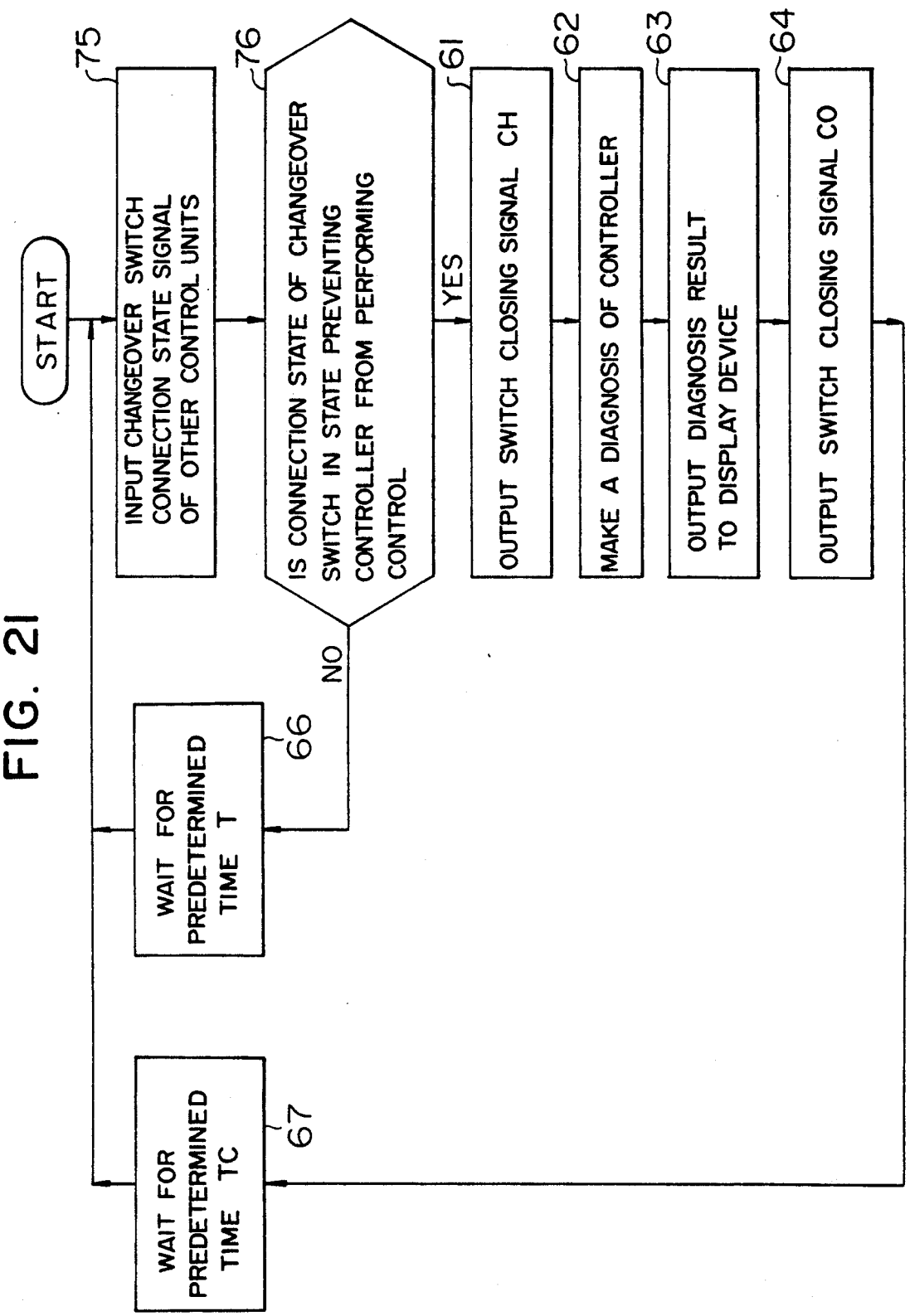

The processing procedure shown in FIG. 21 is stored in the ROM 5B of each of the diagnostic devices 4A to 4D. Operation of the present embodiment will now be described by taking the diagnostic device 4A as an example. Each of the connection state detectors 74A to 74D detects which of the fixed terminals 8A and 8B of each changeover switch is connected to the movable terminal 8 of the changeover switch. As a signal indicating the connection state of the changeover switches of each control unit (i.e., as a connection state signal), each of the connection state detectors 74A to 74D outputs a control state signal of a logic "0" when the movable terminal 8C is connected to the fixed terminal 8A. As the connection state signal, each of the connection state detectors 74A to 74D outputs a diagnosis state signal of a logic "1" when the movable terminal 8C is connected to the fixed terminal 8B.

First of all, the diagnostic device 4A receives connection state signals outputted from the connection state detectors 74B to 74D disposed in the other control units (step 75). On the basis of the connection state signals thus inputted, the diagnostic device 4A judges whether the connection state of changeover switches in at least one other control unit is a state preventing the corresponding controller from controlling the electromagnetic valve 23, i.e., whether the connection state signal is a logic "1" or not (step 76). If the inputted connection state signal is a logic "1", some control unit is in the diagnosis state, and hence the processing of the step 66 is executed. That is to say, the diagnosis made of the controller 2A by the controller 4A is stopped. If the decision at the step 76 is "YES", all of other control units are in the control state, and processing of the steps 61 to 64 and 66 to 67 is executed.

In the present embodiment, the same effects as those of the embodiment of FIG. 18 can be obtained. Since the connection state detectors are provided in the present embodiment, however, the structure becomes complicated as compared with the embodiment of FIG. 1. In the control unit $1A_1$, for example, connection states of the changeover switches $6A_1$ to $6A_n$ and 7A are identical to each other. Therefore, the connection state detector may be disposed in only one changeover switch such as the changeover switch 7A. Other control units may be configured in the same way.

Figure 22:
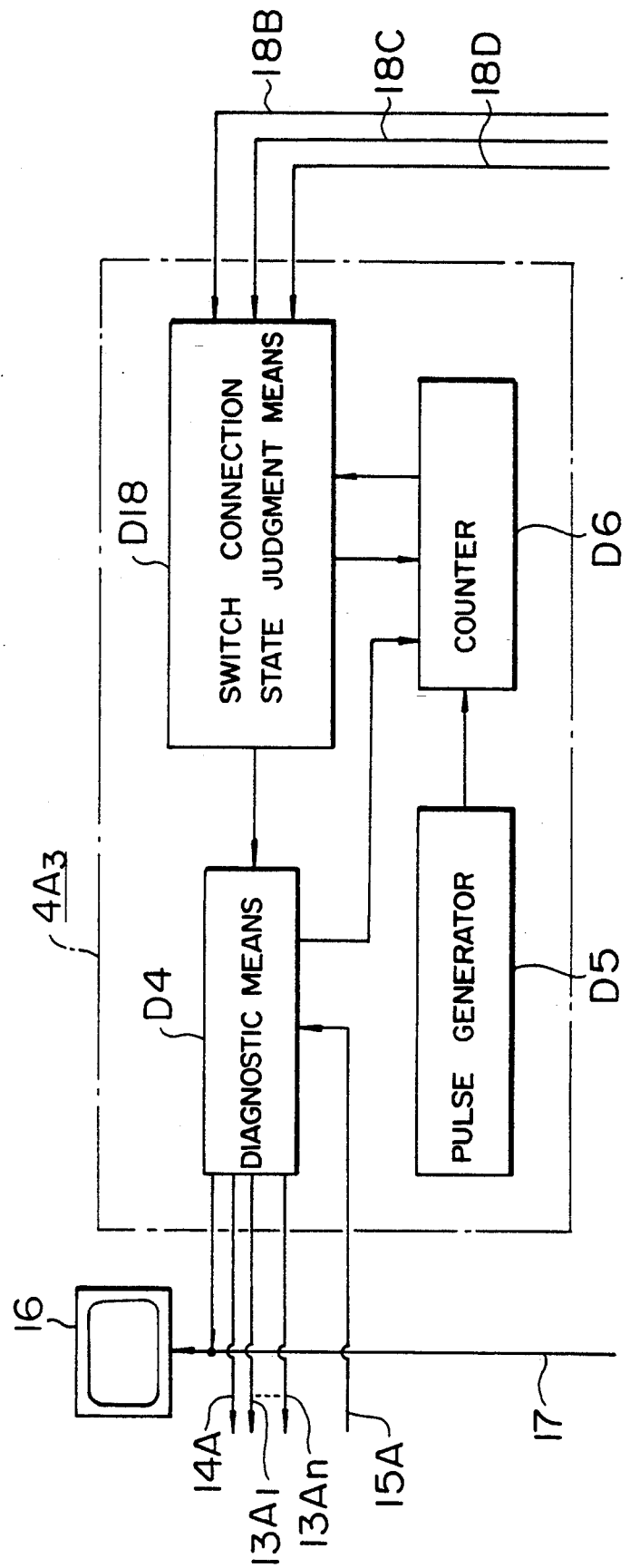
FIG. 22 is a diagram used for explaining the function of a diagnostic device of FIG. 20 executing the processing procedure of FIG. 21.

FIG. 22 is a functional representation of the diagnostic device 4A storing therein the processing procedure of FIG. 21. The diagnostic devices 4B to 4D can be represented in the same way. The diagnostic device $4A_3$ functionally representing the diagnostic device 4A comprises switch connection state judgment means D18 having the function of the step 76 in addition to the diagnostic means D4, the pulse generation means D5 and the counter D6.

The concept of the steps 59A and 60A in the embodiment of FIG. 17 can be applied to the embodiments of FIGS. 18 and 21. In the embodiments of FIGS. 18 and 21 as well, this makes it possible to make diagnoses simultaneously of a plurality of controllers without hampering the signal selection function of the signal selection device 20.

Figure 23:
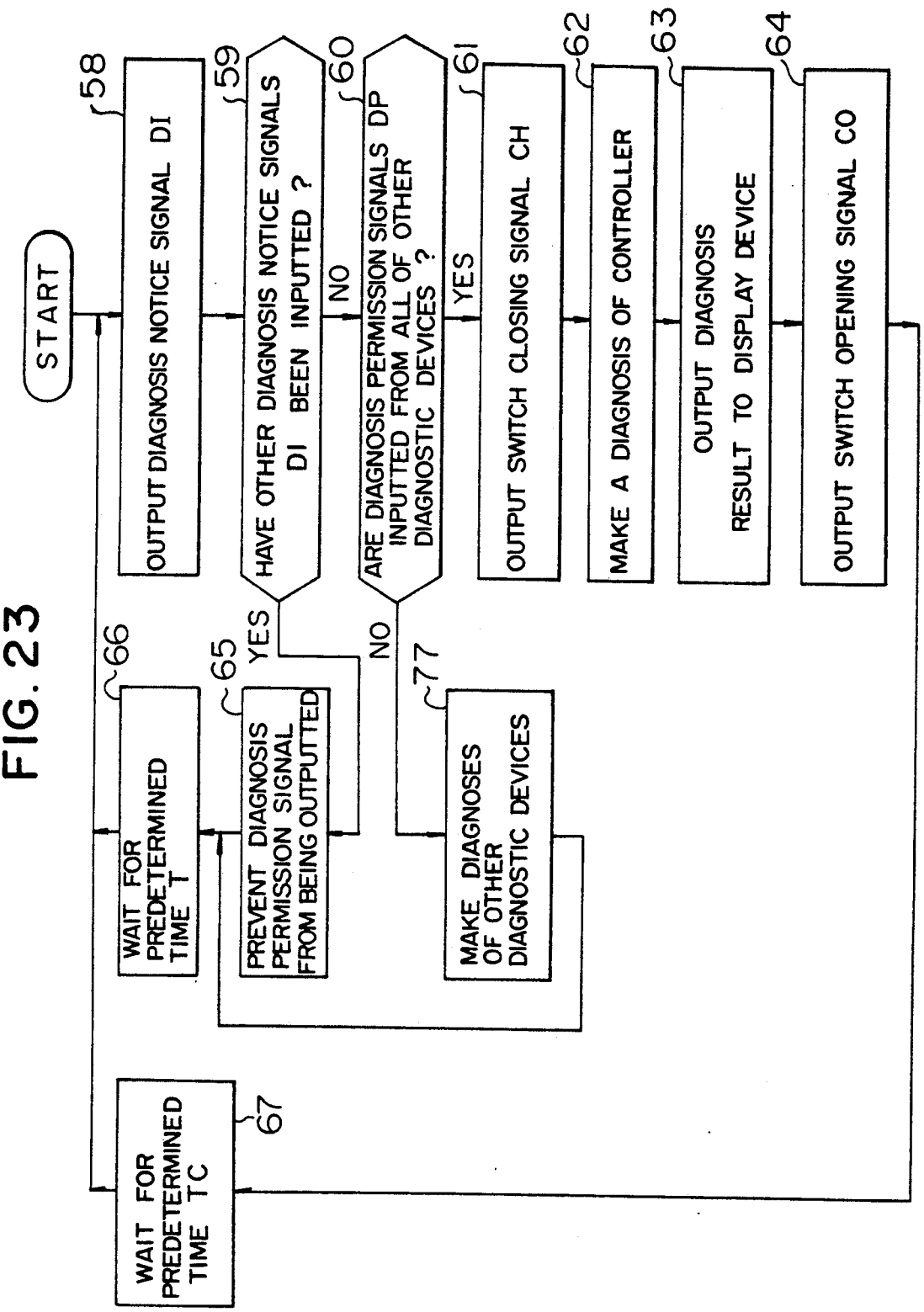

A nuclear reactor protection apparatus which is another embodiment of the present invention will now be described by referring to FIG. 23. In the present embodiment, the configuration of FIG. 1 is used, and the processing procedure of FIG. 23 is stored in the ROM 5B of each of the diagnostic devices 4A to 4D instead of the processing procedure of FIG. 8. The processing procedure of FIG. 9 is also stored in the ROM 5B.

Figure 24:
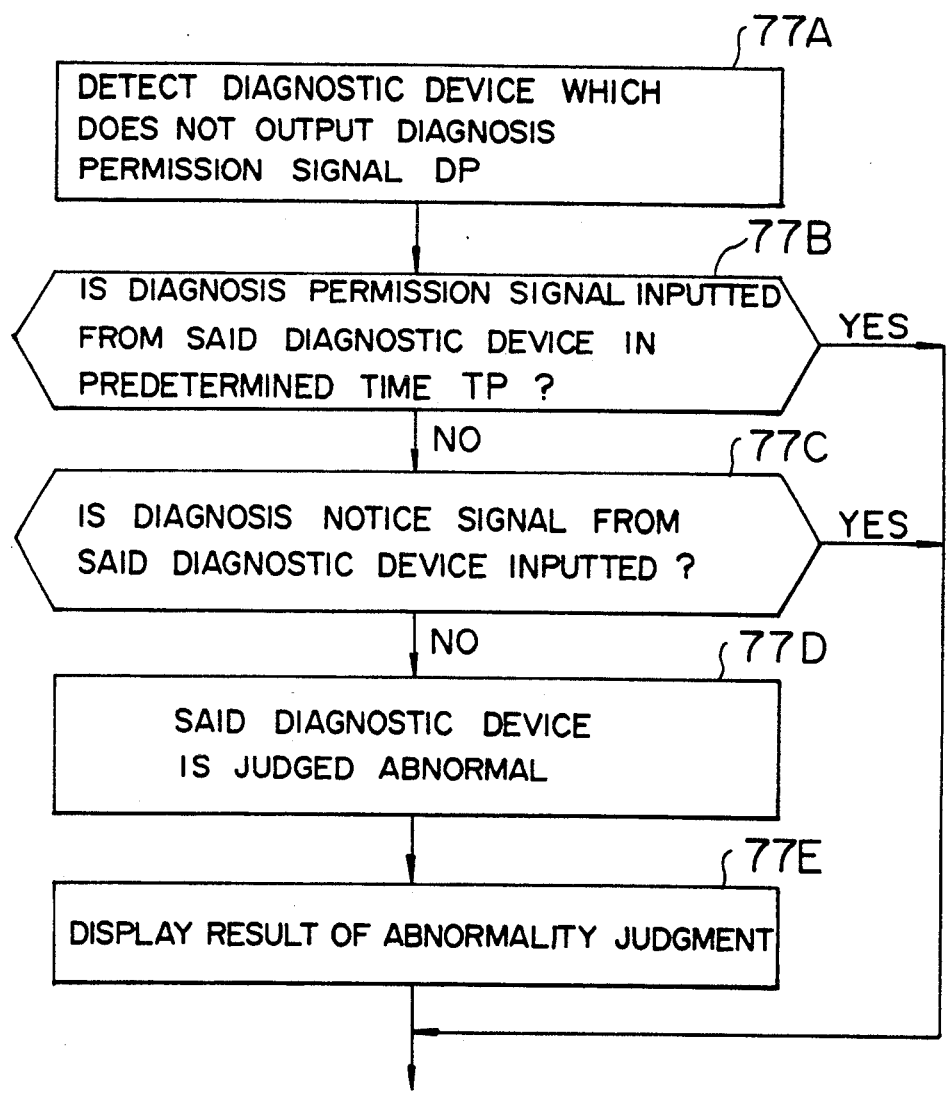
FIG. 24 is a flow chart showing the detailed processing procedure of step 77 shown in FIG. 23.

Operation of the present embodiment will now be described by taking the diagnostic device 4A as an example. The CPU 5A of the diagnostic device 4A calls the processing procedure from the ROM 5B and executes processing based upon the processing procedure thus called. The processing procedure in the present embodiment is equivalent to the processing procedure of FIG. 8 with the processing of step 77 added thereto. Diagnosis is made of other diagnostic devices at the step 77 when the decision at the step 60 becomes "NO". When the processing of the step 77 is finished, processing Proceeds to the step 66. The processing of the step 77 will now be described in detail by referring to FIG. 24.

Figure 25:
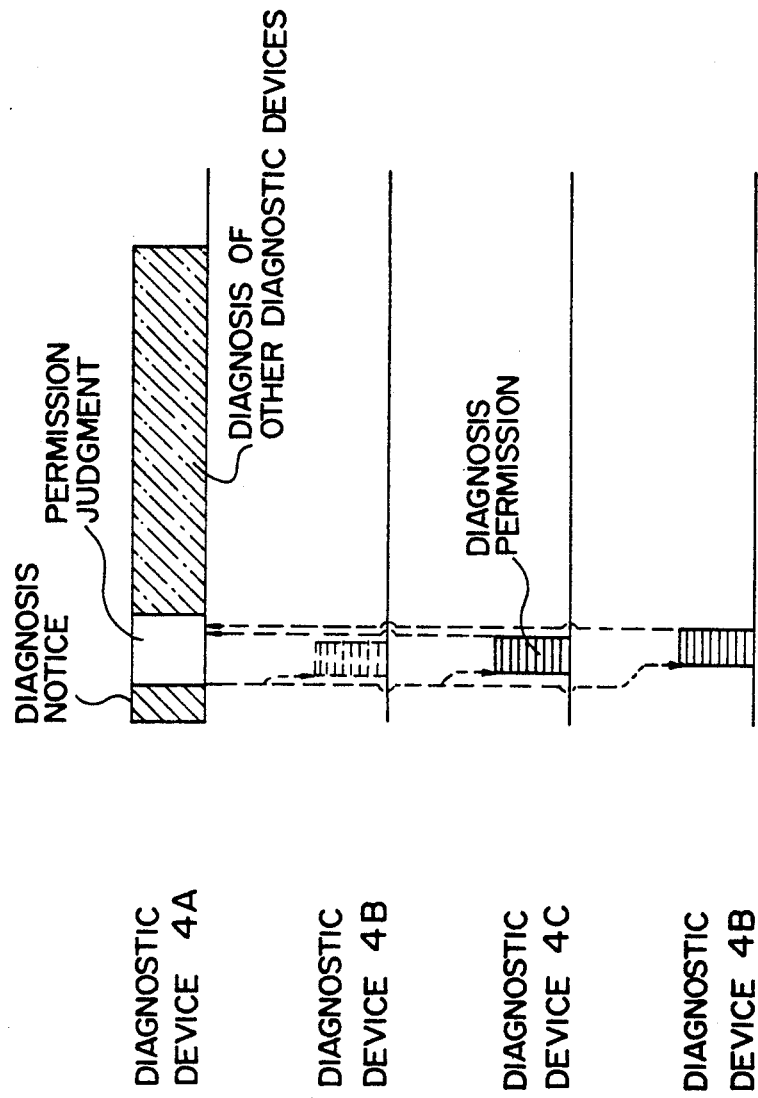
FIG. 25 is a time series diagram showing one mode of the diagnostic device in case the processing procedure of FIG. 23 is executed.

Step 77A is executed. A diagnosis permission signal DP contains the address signal of the diagnostic device which has outputted it. On the basis of the address signal of the inputted diagnosis permission signal DP, therefore, the diagnostic device 4A is able to know the diagnostic device which has outputted the diagnosis permission signal DP. By excluding diagnostic devices which have outputted diagnosis permission signals DP out of all diagnostic devices, therefore, the diagnostic device which does not output the signal DP is known. It is then judged whether the diagnostic device which has no outputted the diagnosis permission signal DP outputs a diagnosis permission signal DP in a predetermined time TP or not (step 77B). The predetermined time TP is set so as to be longer than a time taken for another diagnostic device to make a diagnosis upon the controller. This is because the diagnosis permission signal DP is no outputted at the step 69 (FIG. 9) when another diagnostic device is in the diagnosis state and the diagnosis permission signal is outputted when the diagnosis has been completed. If the decision at the step 77B is "YES", processing proceeds to the step 66. If the decision at the step 77B is "NO", processing of the step 77C is executed. If the decision at the step 77C is "YES", the diagnosis notice signal DI is outputted and hence said diagnostic device is judged to normally function. The processing of the step 66 is then performed. If the decision at the step 77C is "NO", said diagnostic device is judged abnormal at step 77D. This is because answer is not returned from said diagnostic device in the predetermined time TC. The result of the abnormality decision is outputted onto the wiring 17 at step 77E. This result of the abnormality decision is displayed on the display device 16. FIG. 25 is a time series representation of the processing performed in the present embodiment.

In the present embodiment, effects similar to those of the embodiment of FIG. 1 can be obtained, and abnormalities in other diagnostic devices can be detected.

From the viewpoint of function, the diagnostic device 4A storing therein the processing procedure of FIG. 23 is equivalent to the diagnostic device $4A_1$ of FIG. 14 with diagnostic means D4 having the function of the step 77 added thereto.

Figure 26:
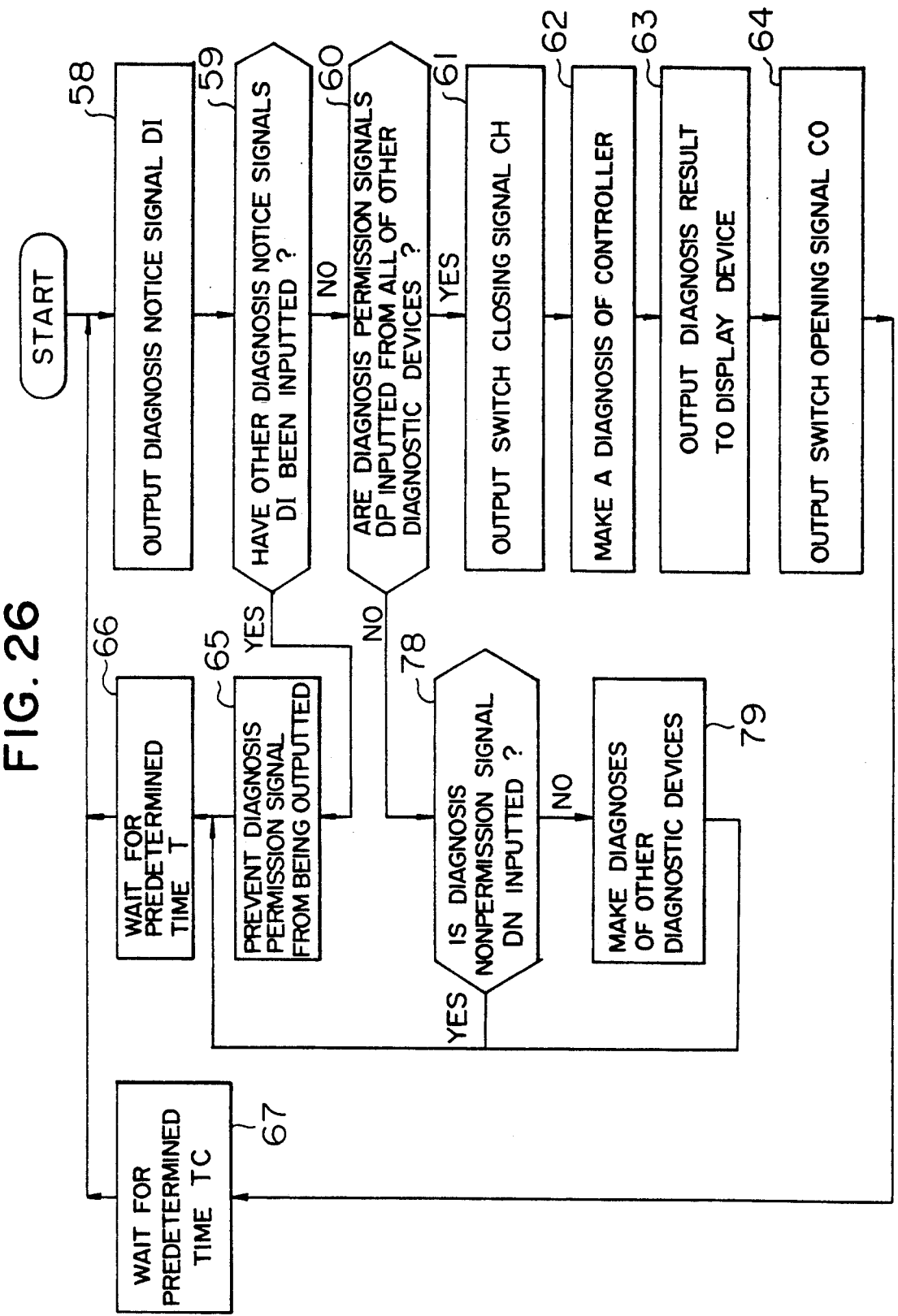
Figure 28:
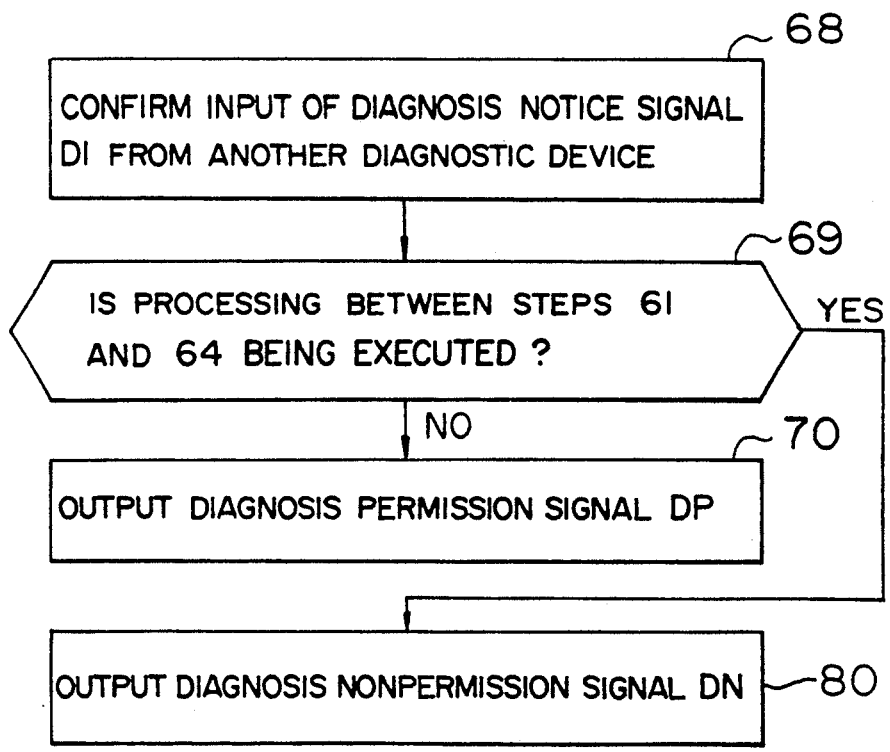
FIG. 28 is a flow chart used for explaining the processing procedure of interrupt processing corresponding to the processing procedure of FIG. 26.

Another embodiment of FIG. 23 in which diagnosis of abnormality of diagnostic devices can be made will now be described by referring to FIG. 26. In the present embodiment, the configuration of FIG. 1 is used, and the processing procedures of FIGS. 26 and 28 are stored into the ROM 5B of each of the diagnostic devices 4A to 4D. The processing procedure of FIG. 28 is used instead of the processing procedure of FIG. 9.

Operation of the present embodiment will now be described by taking the diagnostic device 4A as an example. First of all, there will now be described interrupt processing which is performed when a diagnosis notice signal DI is inputted from another diagnostic device while the diagnostic device 4A is executing the main processing of FIG. 26. This interrupt processing is executed in accordance with a processing procedure shown in FIG. 28. This processing procedure is equivalent to the processing procedure of FIG. 9 with step 80 added thereto. If the decision at the step 69 is "YES", the diagnostic device 4A outputs a diagnosis nonpermission signal DN with its own address signal added thereto onto the wiring 18A at the step 80. When a diagnosis notice signal DI is inputted from another diagnostic device, each diagnostic device necessarily outputs either the diagnosis permission signal DP or the diagnosis nonpermission signal DN as a result of interrupt processing.

Figure 27:
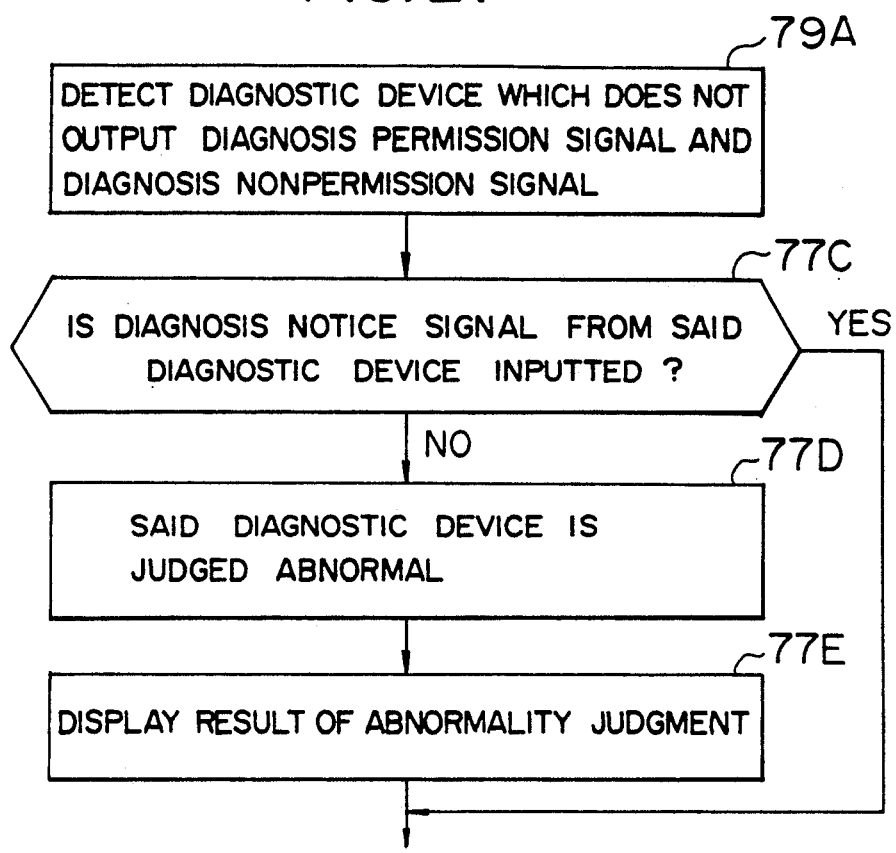
FIG. 27 is a flow chart used for explaining detailed processing procedure of step 79 shown in FIG. 26.

Contents of processing performed in the diagnostic device 4A will now be described by referring to the processing procedure of FIG. 26. This processing procedure is equivalent to the processing procedure of FIG. 8 with processing of steps 78 and 79 added thereto. If the decision at the step 60 is "NO", judgment of the step 78 is performed. If a diagnosis nonpermission signal DN is judged at the step 78 to have been inputted, processing proceeds to the step 66. Especially at the step 78, it is judged whether another diagnostic device which does not output the diagnosis permission signal DP outputs the diagnosis nonpermission signal DN or not. This judgment can be easily performed because the address signal of the diagnostic device is included in the diagnosis permission signal DP and the diagnosis nonpermission signal DN. If the decision at the step 78 is "NO", processing of the step 79 comprising a processing procedure shown in FIG. 27 is executed. The processing procedure of FIG. 27 is equivalent to the processing procedure of FIG. 24 with the steps 77A and 77B replaced by the step 79A. Detection of a diagnostic device which does not output the diagnosis permission signal and the diagnosis nonpermission signal at the step 79A is performed in the same way as the step 77A because the address signal is contained in each signal. After the processing of the step 79A has been finished, processing of the steps 77C to 77E is executed.

The present embodiment yields the same effects as those of the embodiment shown in FIG. 23. In the Present embodiment, however, it is not necessary to Perform processing such as the step 77B of the embodiment shown in FIG. 23 comprising a long waiting time. As compared with the embodiment of FIG. 23, abnormalities in other diagnostic devices can be rapidly detected. Judgment of the step 77C may comprise some waiting time. By making the diagnosis permission signal DP and the diagnosis nonpermission signal DN comprise pulse signals of logic "0" and "1", degenerate breakdown of a logic "0" or a logic "1" can also be detected as described before with reference to the embodiment of FIG. 1.

The functional representation of the diagnostic device 4A storing therein the processing procedure of Fig. 26 is substantially the same as the functional representation of FIG. 23 with the exception of difference in processing contents of the diagnostic means of the diagnostic device.

In the embodiment of FIG. 26, the judgment of the step 60 may be changed to "IS DIAGNOSIS NONPERMISSION SIGNAL DN INPUTTED FROM ANOTHER DIAGNOSTIC DEVICE?". If the result of the judgment thus changed is "NO", the Processing of the step 61 is performed. If the result of the judgment thus changed is "YES", judgment of the step 78 modified as described below is performed. The judgment of the step 78 is modified to become "HAS DIAGNOSIS PERMISSION SIGNAL DP BEEN INPUTTED?".

Figure 29:
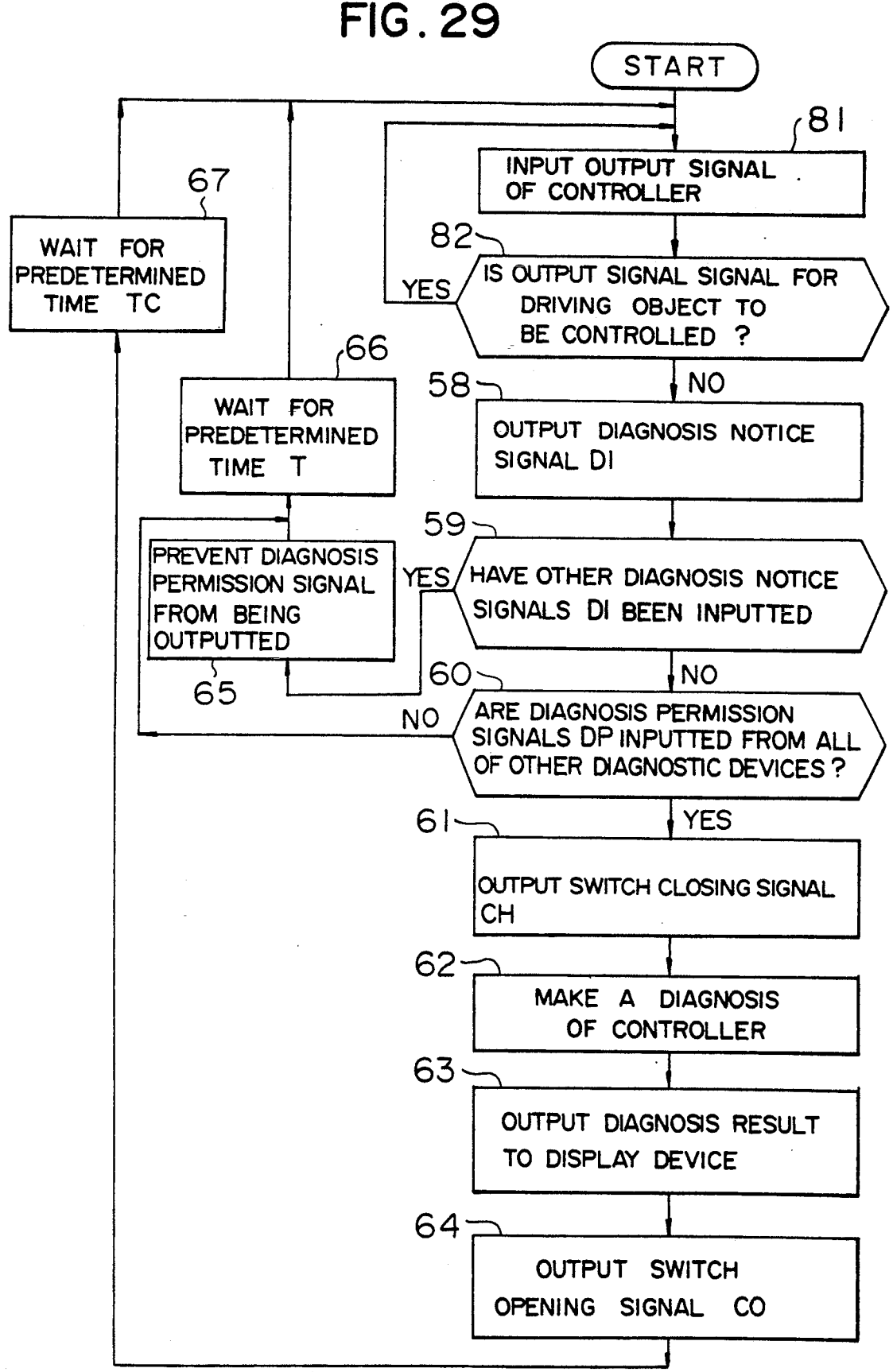

A nuclear reactor protection apparatus which is another embodiment will now be described by referring to FIG. 29. In the present embodiment, the configuration of FIG. 1 is used and the processing procedures of FIGS. 9 and 29 are stored in the ROM 5B of each of the diagnostic devices 4 to 4D.

Operation of the present embodiment will now be described by taking the diagnostic device 4A as an example. On the basis of the processing procedure of FIG. 29 called from the ROM 5B, the CPU 5A of the diagnostic device 4A executes processing. The processing procedure of FIG. 29 is equivalent to the processing procedure of FIG. 8 with steps 81 and 82 added thereto. The steps 81 and 82 are executed before the step 58.

At the step 81, the diagnostic device 4A takes in the output signal a of the controller 2A. At the step 82, it is judged whether the output signal a thus taken in is a signal for driving (opening) the electromagnetic valve 23 to be controlled or not. In the present embodiment, the output signal of a logic "0" opens the electromagnetic valve 23. If a logic "0" is outputted from the controller 2A as the output signal "0", therefore, processing does not proceed to the step 58, and the step 81 is executed again. In the present embodiment, diagnosis made of the controller 2A by the diagnostic device 4A is thus prevented when the controller 2A outputs the signal for driving the electromagnetic valve 2A.

Making a diagnosis of a controller which is outputting a signal for driving the control object leads to confusion in control of the control object. In the present embodiment, such confusion can be avoided. If the controller 2A is judged at the step 82 to output at the step 55 (FIG. 6) a signal which does not drive the electromagnetic valve 23 (i.e., output signal a of a logic "1"), the processing of the step 58 and the succeeding steps is executed.

In the present embodiment, the effects obtained in the embodiment of FIG. 1 can be obtained in addition to the above described effects.

It is also possible to execute the steps 81 and 82 of the present embodiment before the step 58 of FIGS. 17 and 26.

A functional representation of the diagnostic device 4A storing therein the processing procedure of FIG. 29 is obtained by adding signal judgment means having the function of the steps 81 and 82 to the diagnostic device of FIG. 14.

Figure 30:
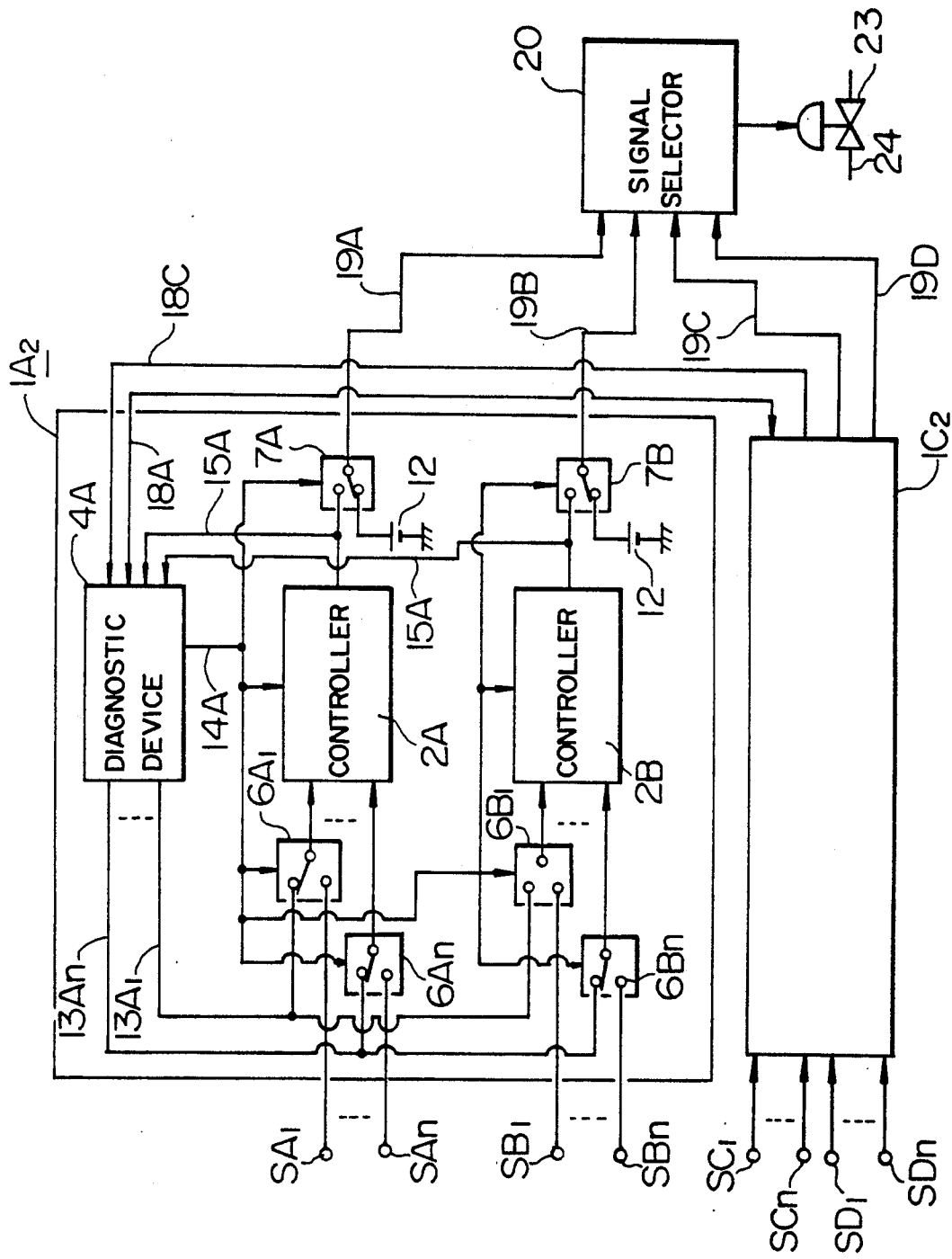

A nuclear reactor protection apparatus which is another embodiment of the present invention will now be described by referring to FIG. 30. In the present embodiment, four redundant controllers are divided into two groups, and one diagnostic device is disposed for two controllers. That is to say, the present embodiment comprises control units $1A_2$ and $1C_2$. The control unit $1A_2$ is obtained by uniting the control unit 1A and the control unit 1B of FIG. 1, removing one diagnostic device 4B, and providing the diagnostic device 4A with the function of the diagnostic device 4B. The control unit $1C_2$ is obtained by uniting the control unit 1C and the control unit 1D of FIG. 1, removing the diagnostic device 4D, and providing the diagnostic device 4C with the function of the diagnostic device 4D. The diagnostic device 4A of the present embodiment has the processing procedure of FIG. 8 stored in the diagnostic device 4A and 4B of FIG. 1. In the present embodiment, however, the step 60 is modified to be judgment represented as "HAS DIAGNOSIS PERMISSION SIGNAL DP BEEN INPUTTED FROM OTHER DIAGNOSTIC DEVICES?".

In the present embodiment as well, effects similar to those of the embodiment of FIG. 1 can be obtained. Further, the number of wires is reduced as compared with the embodiment of FIG. 1, and the system is simplified as a whole. In one control unit, however, one diagnostic device make a diagnosis of two controllers. If the diagnostic device breaks down, therefore, diagnosis of all controllers within on control unit is not suitably performed. In the present embodiment, therefore, the reliability is lower as compared with the embodiment of FIG. 1.

In each of the embodiments heretofore described, four redundant controllers are used. The present embodiment can be applied to other multicontroller apparatuses as exemplified below.

Figure 31:
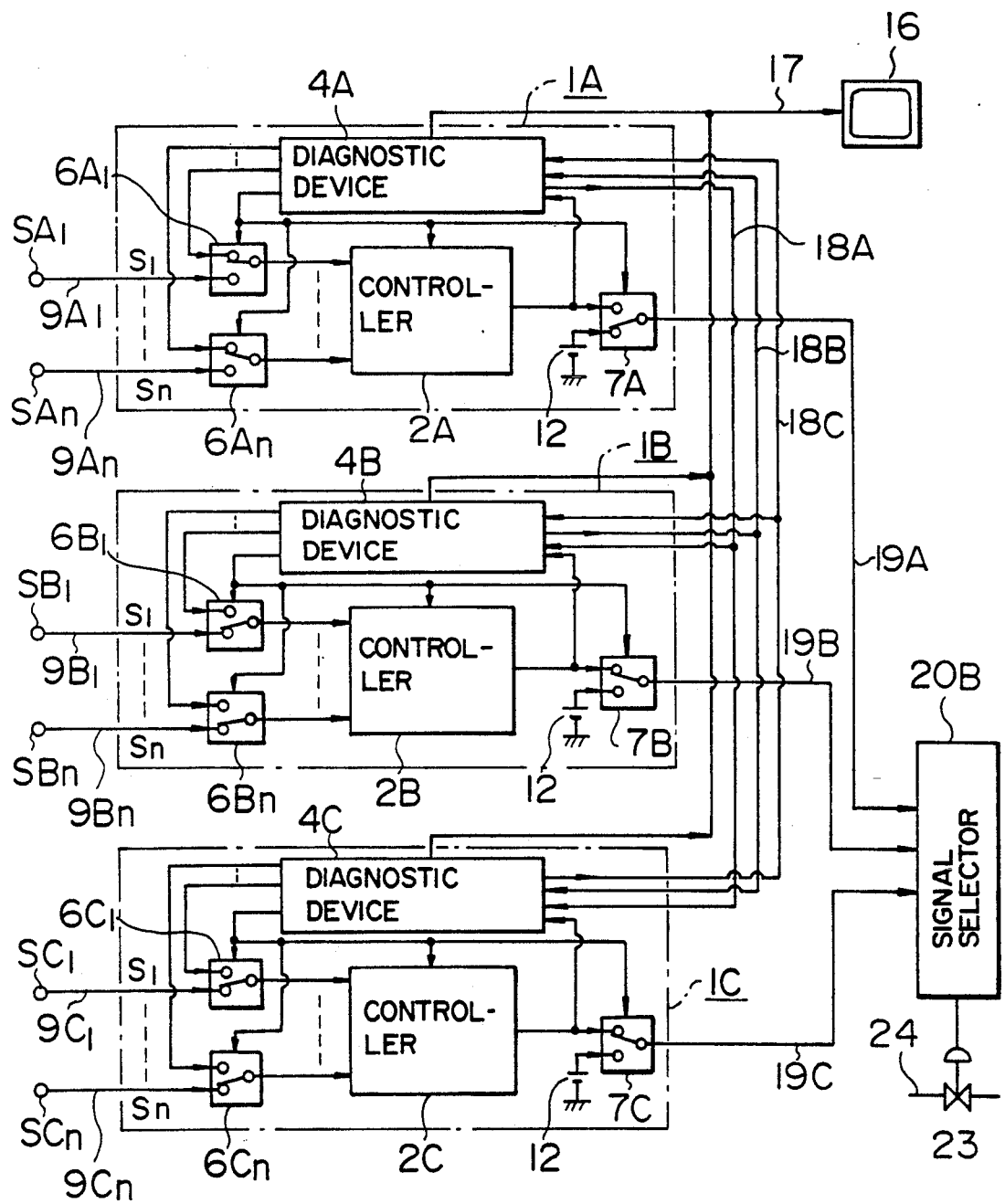

The embodiment of FIG. 31 comprises three redundant controllers. The present embodiment comprises three redundant control units 1A, 1B and 1C. Each of these control units has the same configuration as that of a control unit denoted by a like symbol in FIG. 1. The processing procedures of FIGS. 8 and 9 are stored in the diagnostic devices 4A, 4B and 4C.

Figure 2:
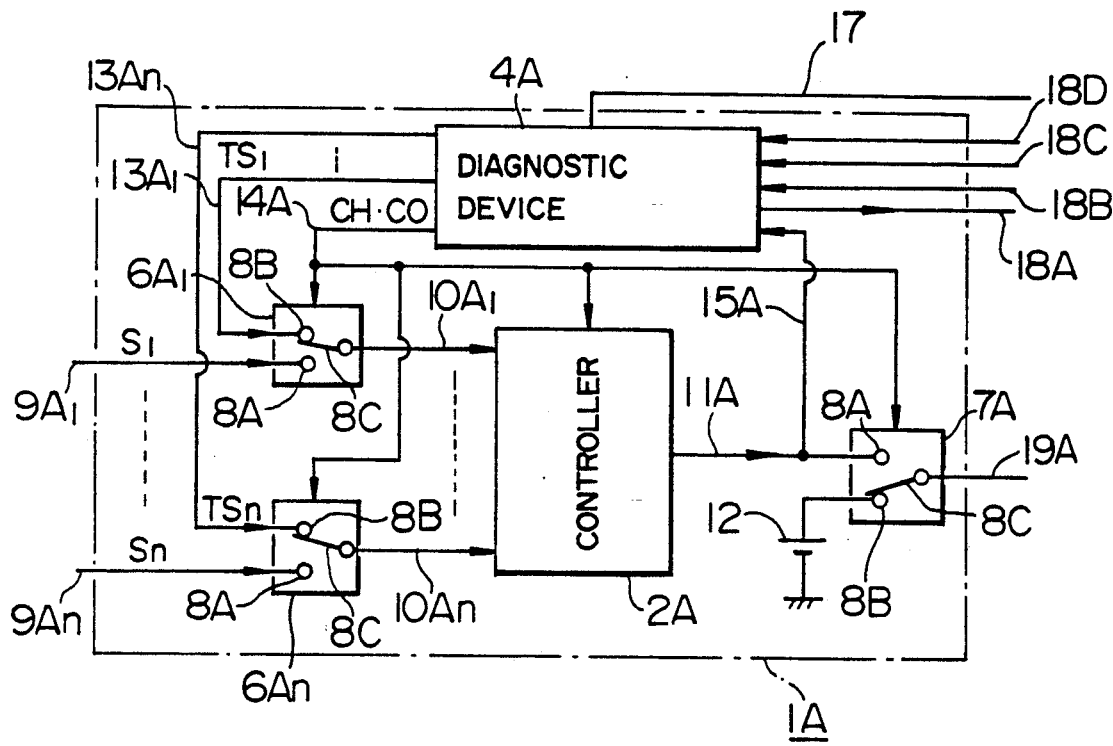
FIG. 2 is a detailed configuration diagram of a control unit shown in FIG. 1.

The signal selection device 20B used in the present embodiment has circuit configuration comprising 2 out of 3 logic configuration shown in FIG. 2 of JP-B-62-226370 filed on September 1987 (U.S. patent application Ser. No. 242,170 filed on Sep. 9, 1988, or JP-A-64-70802 laid open on Mar. 16, 1989).

In the present embodiment, the same effects as those of the embodiment of FIG. 1 can be obtained.

The technical ideas of respective embodiments of four redundant controllers described above can be applied to three redundant controllers.

Figure 32:
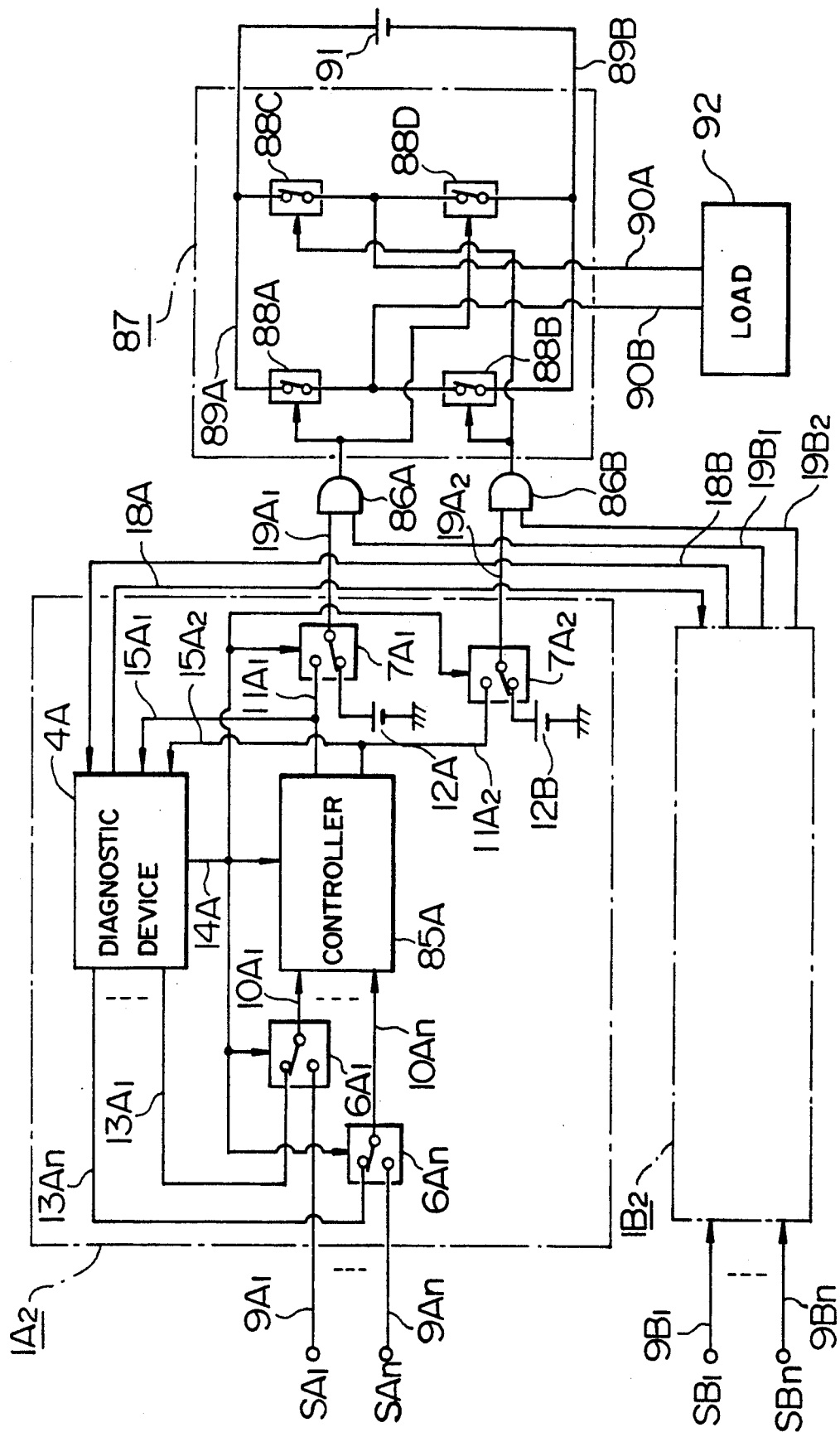

Another embodiment of the present invention which has been applied to an apparatus comprising duplicate controllers is shown in FIG. 32. The present embodiment has been applied to an inverter control system.

An inverter 87 is a single-phase inverter having the simplest configuration. This inverter 87 comprises four switching elements 88A to 88D. The switching elements 88A and 88B are connected in series. The switching elements 88C and 88D are connected in series. The switching elements 88A and 88C are connected to DC power supply 91 via wiring 89A. The switching elements 88B and 88D are connected to power supply 91 via wiring 89B. Numeral 92 denotes a load (such as an AC motor).

Duplicate control units $1A_2$ and $1B_2$ control the inverter 87. Since these control units have an identical configuration, the configuration will now be described by taking the control unit $1A_2$ as an example. The control unit comprises a controller 85A and changeover switches $7A_1$ and $7A_2$ instead of the controller 2A and the changeover switch 7A included in the control unit 1A of FIG. 1. The controller 85 is also a microprocessor in the same way as the controller 2A. Wiring $10A_1$ to $10A_n$ and wiring 14A are connected to input means of the controller 85. Wiring $11A_1$ and $11A_2$ are connected to output means of the controller 85A. The fixed terminal 8A of the changeover switch $7A_1$ is connected to wiring $11A_1$, whereas the fixed terminal 8A of the changeover switch $7A_2$ is connected to the wiring $11A_2$. Fixed terminals 8B of the changeover switches $7A_1$ and $7A_2$ are connected to the reference power supplies 12A and 12B. The reference power supplies 12A and 12B apply a voltage which corresponds to the logic "1" of signals outputted from the controller 85A to fixed terminals 8B. Wiring $15A_1$ connected to the wiring $11A_1$ and wiring $15A_2$ connected to the wiring $11A_2$ are connected to the input means 5E (FIG. 4) of the diagnostic device 4A.

The wiring 18A connects the output means 5F (FIG. 4) of the diagnostic device 4A included in the control unit $1A_2$ to the input means of the diagnostic device included in the control unit $1B_2$. The wiring 18B connects the input means 5E of the diagnostic device 4A included in the control unit $1A_2$ to output means of the diagnostic device included in the control unit $1B_2$. The movable terminals 8C of the changeover switches $7A_1$ of the control units $1A_2$ and $1B_2$ are connected to input terminals of an AND circuit 86A via wiring $19A_1$ and $19B_1$. The movable terminals 8C of the changeover switches $7A_2$ of the control units $1A_2$ and $1B_2$ are connected to input terminals of an AND circuit 86B via wiring $19A_2$ and $19B_2$. The AND circuit 86A has an output terminal connected to the switching elements 88A and 88D. The AND circuit 86B has an output terminal connected to the switching elements 88B and 88C.

The inverter control system of the present embodiment is disposed in a plant. When the control units $1A_2$ and $1B_2$ are in the control state, the movable terminal 8C of the changeover switches of each control unit is connected to the fixed terminal 8A thereof. Output signals of sensors $SA_1$ to $SA_n$ disposed in the plant are inputted to the controller 85A. On the basis of the inputted signals, the controller 85A outputs control signals onto the wiring $11A_1$ and $11A_2$. The control signal conveyed from the controller 85A onto the wiring $19A_1$ and the control signal conveyed from the controller 85A onto the wiring $19A_2$ are pulse signals which are opposite each other in logic "0" and logic "1". The controller of the control unit 1B$_2$ also receives output signals of sensors SB$_1$ to SB$_n$ and outputs control signals comprising a logic "0" and a logic "1". The control signal conveyed from the controller of the control unit 1B$_2$ onto wiring 19B$_1$ and the control signal conveyed from the controller onto wiring 19B$_2$ are also pulse signals which are opposite to each other in logic "0" and logic "1". Therefore, pulse signals respectively outputted from AND circuits 86A and 86B to the inverter 87 are opposite to each other in logic "0" and logic "1". When the AND circuit 86A outputs a logic "0", the switching elements 88A and 88D are opened. When the AND circuit 86A outputs a logic "1", the switching elements 88A and 88D are closed. When the AND circuit 86B outputs a logic "0", the switching elements 88B and 88C are closed. When the AND circuit 86B outputs a logic "1", the switching elements 88B and 88C are opened. Therefore, the switching elements 88A and 88D are opposite to the switching elements 88B and 88C in opening and closing operation.

When the switching elements 88A and 88D are closed, a current flows from the power supply 91 to the power supply 91 through the switching element 88A, wiring 90B, the load 92, wiring 90A and the switching element 88D. When the switching elements 88B and 88C are closed, a current of opposite direction flows from the wiring 90A to the wiring 90B through the load 92. The inverter 87 converts a DC current of the power supply 91 into an AC current by using the opening and closing operation of four switching elements and applies the resulting AC current to the load 92. The frequency of the AC current applied to the load 92 can be controlled according to the period of opening and closing of the switching elements. The controller 85A and the controller of the control unit 1B$_2$ adjust the pulse periods of the Pulse signals which are control signals outputted to the AND circuits 86A and 86B s that the frequency of the AC current applied to the load 92 may be controlled according to the output signals of the sensors.

The function of the diagnostic devices in the present embodiment will now be described by taking the diagnostic device 4A of the control unit 1A$_2$ as an example. The processing procedures of FIGS. 8, 9 and 10 are stored beforehand into the ROM 5B of the diagnostic device 4A. On the basis of these processing procedures, a diagnosis is made upon the controller 85A in the same way as the embodiment which has been described first above. When the switch closing signal CH is outputted from the diagnostic device 4A, the movable terminal 8C is connected to the fixed terminal 8B in all of changeover switches included in the control unit 1A$_2$. Therefore, the changeover switches 7A$_1$ and 7A$_2$ output signals of a logic "1" respectively outputted from the reference power supplies 12A and 12B. Accordingly, the opening/closing control of the switching elements in the inverter 87 is substantially performed by the output signal of the controller of the control unit 1B$_2$.

The present embodiment yields the same effects as those of the embodiment of FIG. 1.

The inverter control system shown in FIG. 32 can be applied to an elevator, an electric car and the like using an inverter. For some applications, instead of the output signals of the sensors, a signal outputted by operator's manipulation on a control panel may be inputted to the controller to produce a control signal for changing the frequency of the AC current applied to the load.

The AND circuits 86A and 86B shown in FIG. 32 may be replaced with respective OR circuits by removing the reference power supplies 12A and 12B and directly connecting the fixed terminals 8B of the changeover switches 7A$_1$ and 7A$_2$ to the ground. In such configuration as well, operation similar to that of the embodiment shown in FIG. 32 is performed.

The processing procedures of FIGS. 18, 21, 23, 26 and 29 can be applied to the embodiment of FIG. 32.

Figure 33:
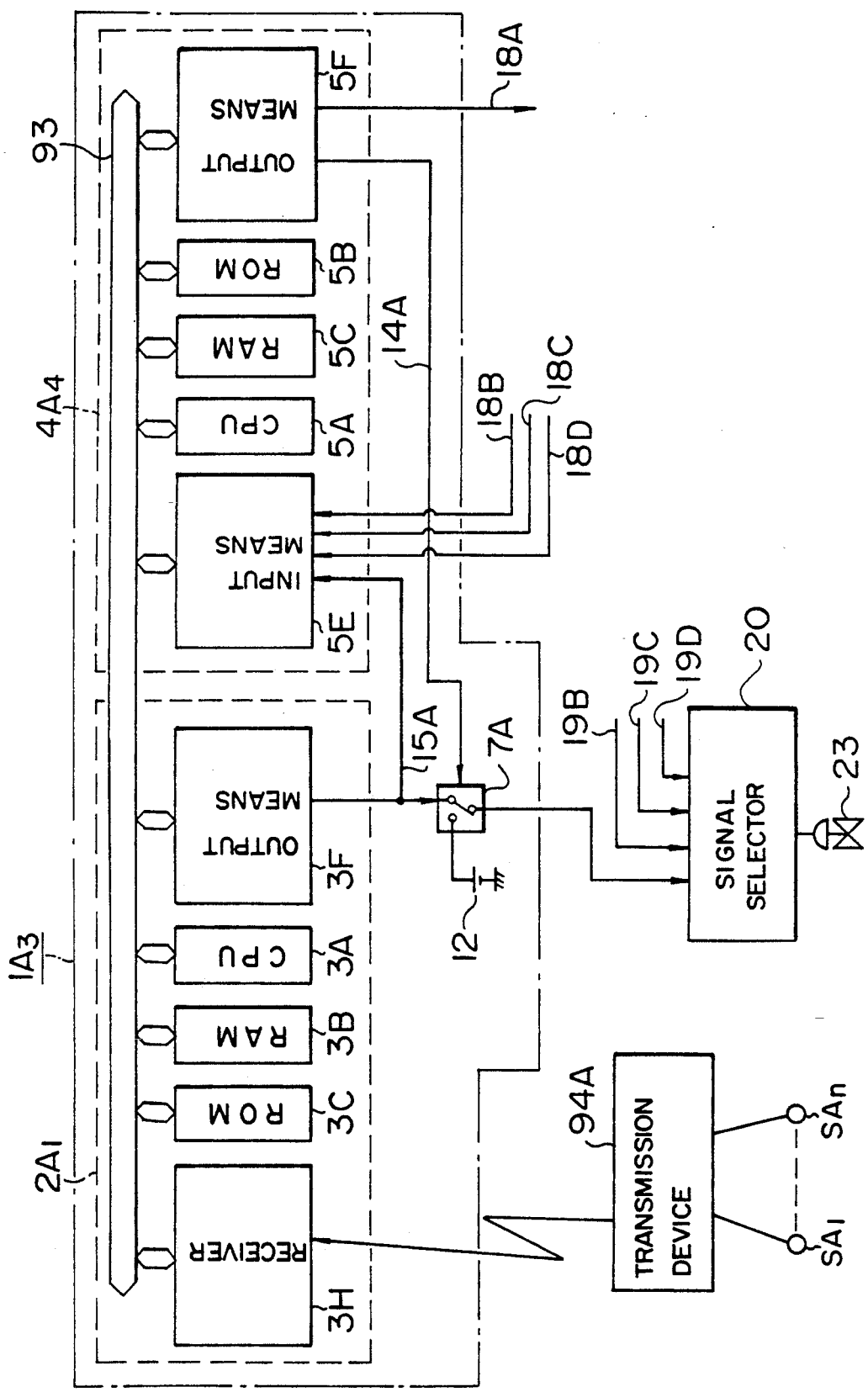

Another embodiment of the present invention which has been applied to an apparatus comprising four redundant controllers will now be described by referring to FIG. 33. FIG. 33 shows one control unit 1A$_3$ of an apparatus comprising four redundant controllers. Three other control units also have the same configuration as that of the control unit 1A$_3$. The control unit 1A$_3$ comprises a controller 2A$_1$, a diagnostic device 4A$_4$ and a changeover switch 7A. Both the controller 2A$_1$ and the diagnostic device 4A$_4$ are microprocessors. The controller 2A$_1$ and the diagnostic device 4A$_4$ are connected by one bus 93 comprising a data bus and a address bus. The CPU 3A, RAM 3B, ROM 3C, output means 3F and a receiving device 3H are connected to the bus 93. The CPU 5A, ROM 5B, RAM 5C, input means 5E and output means 5F are connected to the bus 93. A processing procedure matched to the controller 2A$_1$ of the present embodiment corresponding to FIG. 6 is stored in the ROM 3C. The processing procedures of FIGS. 8 and 9 are stored in the ROM 5B.

When the control unit 1A$_3$ is in the control state, output signals of the sensors SA$_1$ to SA$_n$ are taken into the receiving device 3H via a transmission device 94A and stored into the RAM 3B. On the basis of the processing procedure, the CPU 3A processes the input signals stored in the RAM 3B and outputs a pertinent output signal via the output means 3F. This output signal is inputted to the signal selection device 20 via the changeover switch 7A.

The controller 2A$_1$ and the diagnostic device 4A$_4$ use the bus 93 as a common bus. Therefore, it is necessary to prevent the CPU 3A of the controller 2A$_1$ and the CPU 5A of the diagnostic device 4A$_4$ from exclusively using the bus 93 at the same time. This can be achieved by disposing a well known bus arbiter in each CPU.

In accordance with the processing procedure of FIG. 8 stored in the ROM 5B, the CPU 5A of the diagnostic device 4A$_4$ executes predetermined processing. If the step 58 is finished and decision at the steps 59 and 60 are respectively "NO" and "YES", the changeover switch closing signal CH is outputted at the step 61. By the output of the changeover switch closing signal CH, the movable terminal 8C is connected to the fixed terminal 8B in the changeover switch 7A. When the CPU 5A exclusively uses the bus 93, the CPU 5A outputs the test signals TS$_1$ to TS$_n$ onto the bus 93 on the basis of the step 62A. These test signals are stored in the RAM 3B. To be specific, output signals of the sensors SA$_1$ to SA$_n$ inputted from the receiving device 3H are stored in the same addresses as those of the RAM 3B. Thereafter, the bus 93 is released from the exclusive use by the CPU 5A. Instead, the CPU 3A exclusively uses the bus 93. The CPU 3A successively reads out the test signals stored in the RAM 3B and performs arithmetic processing on the basis of the processing procedure stored in the ROM 3C. The CPU 3A outputs an answer signal thus obtained. This answer signal is taken into the RAM 5C via the output means 3F, wiring 15A and the input means 5E. After the arithmetic processing of all test signals has been finished, the CPU 5A exclusively uses the bus 93. The CPU 5A reads the answer signal out of the RAM 5C and makes a diagnosis to know whether an abnormality is present in the controller $2A_1$ or not by using the step 62C. Depending upon whether the answer signal has a value corresponding to the pertinent test signal or not, it is decided whether an abnormality is present in the controller $2A_1$ or not.

The present embodiment yields the same effects as those of the embodiment of FIG. 1.

We claim:

1. A multicontroller apparatus having a plurality of control units each including a controller and a diagnostic device for making a diagnosis of said controller, said diagnostic device comprising:
    a judging unit for judging states of other control units of said control units based on output signals of diagnostic devices of said other control units; and
    a diagnosing unit for executing a diagnosis of said controller which is an object of diagnosis made by said diagnostic device when said judging unit judges that more than a predetermined number of control units of said other control units are in a control state.

2. A multicontroller apparatus having a plurality of control units each including a controller and a diagnostic device for making a diagnosis of said controller, said diagnostic device comprising:
    a judging unit for judging states of other control units of said control units based on output signals of diagnostic devices of said other control units; and
    a diagnosis aborting unit for aborting a diagnosis of said controller which is an object of diagnosis made by said diagnostic device when said judging unit judges that at least a predetermined number of control units of said other control units is in a diagnosis state.

3. A multicontroller apparatus having a plurality of control units each including a controller and a diagnostic device for making a diagnosis of said controller, said diagnostic device comprising:
    a diagnosis execution signal outputting unit for outputting a diagnosis execution signal, whereby the fact that a diagnosis is being made is communicated to diagnostic devices of other control units of said control units;
    a judging unit for judging whether a diagnostic device of one or more control units of said other control units is outputting a diagnosis execution signal or not; and
    a diagnosing unit for executing a diagnosis of said controller which is an object of diagnosis made by said diagnostic device when a result of judging by said judging unit is negative.

4. A multicontroller apparatus having a plurality of control units each including a controller and a diagnostic device for making a diagnosis of said controller, said diagnostic device comprising:
    a judging unit for judging states of other control units of said control units based on output signals of diagnostic devices of said other control units; and
    a diagnosing unit for executing a diagnosis of said controller which is an object of diagnosis made by said diagnostic device when said judging unit judges that at least a predetermined number of control units of said other control units are not in a diagnosis state.

5. A multicontroller apparatus according to claim 4, wherein when said judging unit judges that the number of control units of said other control units which are not in the diagnosis state is less than the predetermined number, said diagnostic device prevents reopening of diagnosis made by said diagnostic device for a first predetermined time, and wherein said diagnostic device prevents reopening of diagnosis made by said diagnostic device after the diagnosis of said controller is finished for a second predetermined time longer than said first predetermined time.

6. A multicontroller apparatus according to claim 4, wherein said diagnostic device further comprises:
    a diagnosis notice signal outputting unit for outputting a diagnosis notice signal to other diagnostic devices of said other control units; and
    an answer signal outputting unit for outputting an answer signal in response to a diagnosis notice signal outputted by a diagnostic device of another control unit of said other control units;
    wherein said judging unit judges the state of said another control unit based on the answer signal outputted from said diagnostic device of said another control unit in response to the diagnosis notice signal outputted by said diagnostic device.

7. A multicontroller apparatus according to claim 6, wherein said diagnostic device further comprises:
    a diagnosis notice judging unit for judging whether or not a number of other diagnostic devices of said other control units outputting the diagnosis notice signal is less than a predetermined number; and
    a diagnosis notice signal outputting preventing unit for preventing said diagnosis notice signal outputting unit of said diagnostic device from reoutputting the diagnosis notice signal for a predetermined time based on a result of judging by said diagnosis notice judging unit, said predetermined time being different for each of said diagnostic devices of said control units.

8. A multicontroller apparatus according to claim 4, wherein said diagnostic device further comprises an abnormality judging unit for judging whether an abnormality is present or not in a diagnostic device of another control unit of said other control units based on an output signal of the diagnostic device of said another control unit.

9. A multicontroller apparatus according to claim 6, wherein
    said diagnostic device outputs a first changeover signal when said judging unit judges that at least the predetermined number of control units of said other control units are not in the diagnosis state;
    said diagnostic device outputs a second changeover signal after a diagnosis of said controller is finished; and
    each of said control units further includes a changeover unit which assumes a state preventing control performed by a signal outputted from the controller in response to said first changeover signal, and which assumes a state allowing control performed by the signal outputted from the controller in response to said second changeover signal.

10. A multicontroller apparatus according to claim 4, wherein when the controller which is an object of diagnosis made by said diagnostic device is outputting a signal for controlling an object of control, said diagnostic device is prevented from executing a diagnosis of the controller.

11. A multicontroller apparatus according to claim 4, wherein each of said control units further comprises:
- a switching unit for preventing transmission of an output signal from the controller to an object of control; and
- a detecting unit for detecting a switching state of said switching unit.

12. A multicontroller system comprising:
a plurality of control units each including:
- a controller for outputting a control signal on the basis of inputted process information,
- a diagnostic device for outputting a test signal to the controller and for judging presence/absence of an abnormality in said controller on the basis of an answer signal outputted by the controller in response to the test signal, and
- a switching unit for preventing the control signal outputted by the controller from being received by a signal selection device when the diagnostic device is making a diagnosis of the controller; and
a signal selection device for receiving the control signals outputted by the controllers of the control units, selecting one of the received control signals, and outputting the selected control signal to an object of control;
wherein said diagnostic device includes:
a judging unit for judging states of other control units of said control units based on output signals of diagnostic devices of said other control units, and
a diagnosing unit for executing a diagnosis of said controller which is an object of diagnosis made by said diagnostic device when said judging unit judges that at least a predetermined number of control units of said other control units are not in a diagnosis state.

13. A nuclear reaction protection apparatus comprising:
a plurality of control units each including:
- a controller for outputting a control signal on the basis of inputted process information of a nuclear reactor plant,
- a diagnostic device for outputting a test signal to the controller and for judging presence/absence of an abnormality in said controller on the basis of an answer signal outputted by the controller in response to the test signal, and
- a switching unit for preventing the control signal outputted by the controller from being received by a signal selection device when the diagnostic device is making a diagnosis of the controller; and
a signal selection device for receiving the control signals outputted by the controllers of the control units, selecting one of the received control units, and outputting the selected control signal to an object of control;
wherein said diagnostic device includes:
a judging unit for judging states of other control units of said control units based on output signals of diagnostic devices of said other control units, and
a diagnosing unit for executing a diagnosis of said controller which is an object of diagnosis made by said diagnostic device when said judging unit judges that at least a predetermined number of control units of said other control units are not in a diagnosis state.

14. An inverter control system comprising:
a plurality of control units each including:
- a controller for outputting a frequency control signal on the basis of inputted information,
- a diagnostic device for outputting a test signal to the controller and for judging presence/absence of an abnormality in said controller on the basis of an answer signal outputted by the controller in response to the test signal, and
- a switching unit for preventing the frequency control signal outputted by the controller from being received by an inverter device when the diagnostic device is making a diagnosis of the controller;
wherein said diagnostic device includes:
a judging unit for judging states of other control units of said control units based on output signals of diagnostic devices of said other control units, and
a diagnosing unit for executing a diagnosis of said controller which is an object of diagnosis made by said diagnostic device when said judging unit judges that at least a predetermined number of control units of said other control units are not in a diagnosis state.

15. A multicontroller apparatus having a plurality of control units each including a controller and a diagnostic device for making a diagnosis of said controller, said diagnostic device comprising:
- a judging unit for judging a state of each of other control units of said plurality of control units based on an output signal of a diagnostic device of said each of said other control units; and
- a diagnosing unit for executing a diagnosis of the controller in the control unit including said diagnostic device when said judging unit judges that more than a predetermined number of control units of said other control units are in a control state.

16. A multicontroller apparatus having a plurality of control units each including a controller and a diagnostic device for making a diagnosis of said controller, said diagnostic device comprising:
- a judging unit for judging a state of each of other control units of said plurality of control units based on an output signal of a diagnostic device of said each of said other control units; and
- a diagnosis aborting unit for aborting a diagnosis of the controller in the control unit including said diagnostic device when said judging unit judges that at least a predetermined number of control units of said other control units is in a diagnosis state.

* * * * *